United States Patent
Szabo et al.

(10) Patent No.: US 10,091,138 B2
(45) Date of Patent: Oct. 2, 2018

(54) IN SERVICE UPGRADES FOR A HYPERVISOR OR HARDWARE MANAGER HOSTING VIRTUAL TRAFFIC MANAGERS

(71) Applicant: F5 NETWORKS, INC., Seattle, WA (US)

(72) Inventors: Paul Imre Szabo, Seattle, WA (US); Bryan David Skene, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 229 days.

(21) Appl. No.: 13/671,450

(22) Filed: Nov. 7, 2012

(65) Prior Publication Data

US 2013/0219030 A1    Aug. 22, 2013

Related U.S. Application Data

(60) Provisional application No. 61/601,509, filed on Feb. 21, 2012.

(51) Int. Cl.
  *H04L 29/02* (2006.01)
  *H04L 12/931* (2013.01)
  (Continued)

(52) U.S. Cl.
  CPC .............. *H04L 49/70* (2013.01); *G06F 8/656* (2018.02); *G06F 8/67* (2013.01); *G06F 9/45558* (2013.01)

(58) Field of Classification Search
  None
  See application file for complete search history.

(56) References Cited

U.S. PATENT DOCUMENTS 6,535,924 B1 *   3/2003   Kwok et al. ................. 709/242
7,102,996 B1 *   9/2006   Amdahl et al. .............. 370/230
(Continued)

FOREIGN PATENT DOCUMENTS

CN   101673283 A   3/2010
CN   102124697 A   7/2011
(Continued)

OTHER PUBLICATIONS

Red Hat Enterprise Linux 6 Hypervisor Deployment Guide, by Red Hat (Revision 2.0 dated Dec. 2, 2011).*
(Continued)

*Primary Examiner* — Scott B Christensen
(74) *Attorney, Agent, or Firm* — John W. Branch; Lowe Graham Jones PLLC

(57) ABSTRACT

Embodiments are directed towards upgrading hypervisors operating in hardware clusters that may be hosting one or more virtual clusters of virtual traffic managers. Virtual clusters may be arranged to span multiple computing devices in the hardware cluster. Spanning the virtual clusters across multiple hardware nodes the virtual cluster may enable the virtual clusters to remain operative while one or more hardware nodes may be upgraded. Hypervisor may include a management control plane for virtual clusters of virtual traffic managers. Hypervisors running on hardware nodes may manage the lower level networking traffic topology while the virtual traffic managers may manage the higher level network processing. Further, hypervisor based management control planes may interface with the virtual clusters and virtual traffic manager's using pluggable translation modules may enable different versions of hypervisor based management control planes and virtual traffic managers to communicate and cooperatively manage network traffic.

21 Claims, 13 Drawing Sheets

(51) Int. Cl.
*G06F 8/656* (2018.01)
*G06F 9/455* (2018.01)
*G06F 9/445* (2018.01)

(56) References Cited

U.S. PATENT DOCUMENTS

| | | | |
|---|---|---|---|
| 8,209,403 B2* | 6/2012 | Szabo et al. | 709/220 |
| 8,301,605 B2* | 10/2012 | Gupta | 707/694 |
| 8,341,686 B2* | 12/2012 | Hale et al. | 725/133 |
| 8,429,276 B1* | 4/2013 | Kumar et al. | 709/226 |
| 8,613,085 B2* | 12/2013 | Diab et al. | 726/22 |
| 8,856,319 B1* | 10/2014 | Huang et al. | 709/224 |
| 2003/0055926 A1 | 3/2003 | Kwok et al. | |
| 2006/0248528 A1* | 11/2006 | Oney | G06F 9/45533 718/1 |
| 2009/0019436 A1* | 1/2009 | Hartz et al. | 717/178 |
| 2009/0157682 A1 | 6/2009 | Gupta | |
| 2010/0042869 A1* | 2/2010 | Szabo | G06F 8/67 714/4.1 |
| 2010/0115080 A1* | 5/2010 | Kageyama | 709/223 |
| 2010/0235825 A1* | 9/2010 | Azulay et al. | 717/172 |
| 2011/0023029 A1* | 1/2011 | Diab et al. | 718/1 |
| 2011/0023030 A1* | 1/2011 | Lim | G06F 9/45558 718/1 |
| 2011/0202917 A1 | 8/2011 | Laor | |
| 2011/0219372 A1* | 9/2011 | Agrawal et al. | 718/1 |
| 2011/0225277 A1* | 9/2011 | Freimuth et al. | 709/223 |
| 2011/0302618 A1 | 12/2011 | Odlund et al. | |
| 2011/0321029 A1* | 12/2011 | Kern et al. | 717/170 |
| 2012/0054736 A1* | 3/2012 | Arcese et al. | 717/172 |

FOREIGN PATENT DOCUMENTS

| | | |
|---|---|---|
| WO | 2008/124560 A1 | 10/2008 |
| WO | 2008124560 A1 | 10/2008 |

OTHER PUBLICATIONS

International Search Report and Written Opinion for International Patent Application No. PCT/US2013/026833 dated May 10, 2013.
Official Communication for Chinese Patent Application No. 201320088613.6 dated Jun. 4, 2013.
Board Opinion issued by the Patent Reexamination Board for Reexamination of Chinese Patent Application No. 201320088613.6 dated Jan. 15, 2015, 8 pages.
Official Communication for Taiwan Application No. 102101045 dated Mar. 30, 2015, 11 pages.
Official Communication for Chinese Application No. 201520696891.9 dated Nov. 20, 2015, 7 pages.
Supplementary European Search Report for European Application 13 75 1572 dated Sep. 24, 2015, 7 pages.
Official Communication for Chinese Application No. 201310059354.9 dated Mar. 13, 2017, 19 pages.

* cited by examiner

IN SERVICE UPGRADES FOR A HYPERVISOR OR HARDWARE MANAGER HOSTING VIRTUAL TRAFFIC MANAGERS

CROSS-REFERENCE TO RELATED APPLICATIONS

This application claims the benefit of U.S. Provisional Application Ser. No. 61/601,509 filed on Feb. 21, 2012, entitled "IN SERVICE UPGRADES FOR A HYPER VISOR OR HARDWARE MANAGER HOSTING VIRTUAL TRAFFIC MANAGERS," the benefit of the earlier filing date of which is hereby claimed under 35 U.S.C. Section 119 (c) and 37 C.F.R Section 1.78, and is further incorporated herein by reference.

TECHNICAL FIELD

The technology relates generally to network devices, and more particularly, but not exclusively, to upgrading clustered network traffic managers while minimizing the impact on existing and new network traffic.

BACKGROUND

The Internet has evolved into a ubiquitous network that has inspired many companies to rely upon it as a major resource for doing business. For example, many businesses may utilize the Internet, and similar networking infrastructures, to manage critical applications, access content servers, automate assembly and production lines, and implement complex control systems. Moreover, many individuals expect to have access to a resource at virtually any time. As the reliance by businesses on access to such networked resources for their success increases, the availability of the systems that provide these services becomes even more critical.

A blade device is one type of computing device component that allows a user to provision servers, application, or other computing resources on an individual card, or "blade". These blades are housed together with shared resources such as power supplies and cooling fans in a chassis, creating a high-density system with a modular architecture that provides improved flexibility and scalability. Blade servers can enable the operation of multiple servers in a relatively small footprint, reduce rack complexity, simplify cabling and reduce energy consumption. These characteristics tend to make it advantageous to implement cooperative computing clusters using blade servers. Also, blade servers are often employed in space-constrained and energy conscious environments, such as data centers and Internet Service Providers (ISPs).

However, upgrading the hardware or software of blade devices in a computing environment is often a difficult, time consuming, and error-prone process. Further, implementing an upgrade can negatively impact the connection-handling and other processes of the environment being upgraded. Blade servers may represent one example of members in a cluster network. However, other types of cluster-based network devices may have similar problems during hardware and/or software upgrades. Also, upgrading hypervisors or privileged hardware managers in a virtualized traffic manager may stop the operation of any other virtual traffic manager instances running on that hardware. If those virtual machines are critical components in an application delivery system, then upgrading can create a costly disruption to a user's applications. Also, this type of disruption can cause cross-organizational challenges when coordinating upgrades across the various organizations responsible for each virtual machine. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association, with the accompanying drawings, wherein.

DETAILED DESCRIPTION

Figure 1:
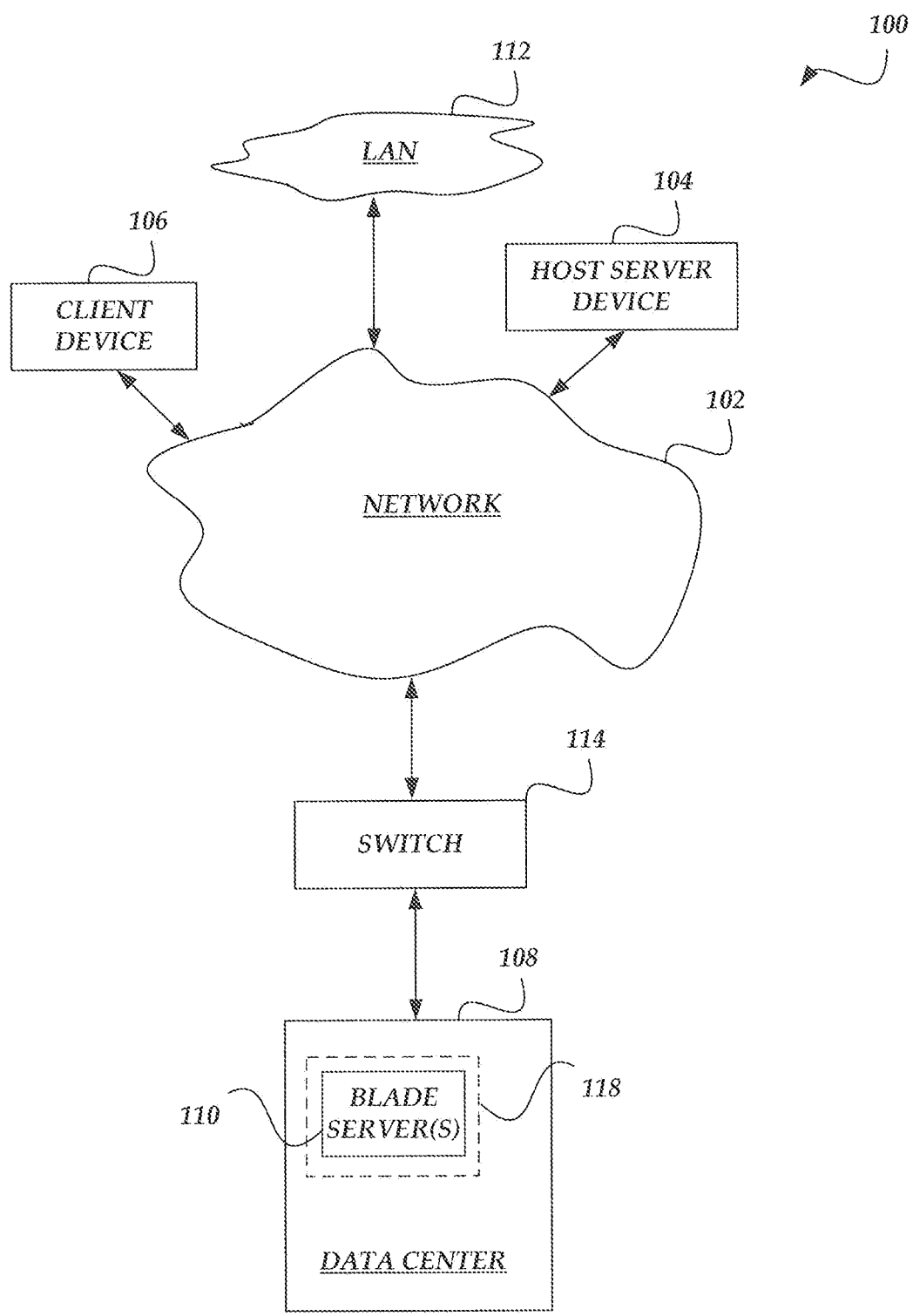
FIG. 1 shows a schematic overview of an environment for practicing the described embodiments.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "blade server" refers to a server that is provisioned on a single card that is typically clustered with other blade servers (multiple cards) in a single chassis or rack. Blade servers are also sometimes referred to as high density, ultra-dense or hyper-dense solutions, where they may often be employed for processing-light and transaction-heavy applications. Each blade server is typically dedicated to a single task or process, including, but not limited to, file sharing, file virtualization/network storage file management, Web page serving, network security management firewalls, authentication, credential management), caching, transcoding, streaming media (video, audio), network traffic management (e.g., load balancing, failover management, acceleration/optimization), and establishing virtual private networks. In some embodiments, a blade server may also be configured to perform one or more combinations of these tasks in conjunction.

A blade server may include one or more operating systems and one or more applications to enable performing different tasks.

The term "upgrade" refers to software upgrades, including operating system version upgrades, although the term should be interpreted broadly to encompass any and other types of software changes, including enabling inactive software code (e.g., driven by software license purchase activities), configuration changes to running software (e.g., hot-fixes, patches, etc.), re-programming or re-purposing a device to perform altogether different functionalities, rolling back to a prior software version, or any change that might otherwise interrupt a device's normal operations (e.g., traffic management related operations); the term should also be interpreted to include hardware upgrades.

To tightly package a blade server in a relatively small footprint (single card), the blade server will typically use a highly miniaturized and energy efficient Central Processing Unit (CPU) such as those employed in portable computing devices. Typically, rows of individual blade servers (which closely resemble the functionality of a motherboard) are in communication with each other over a commonly shared and relatively high-speed bus. In a chassis that is rack mountable, an exemplary blade server based solution can enable the operation of hundreds of CPUs within the confines of a relatively standard six-foot rack.

As used herein, the term "hardware cluster," refers to loosely coupled network devices that cooperate to integrate services, resources, or the like. The hardware cluster provides access to services, resources, and the like, to devices external to the hardware cluster. The hardware cluster otherwise appears to external devices as a single entity on the network. Each network device within the hardware cluster is referred to as a member or node of the hardware cluster. The nodes of a hardware cluster may be blades, or blade servers as discussed above or any other network enabled device, such as will be described below in conjunction with FIG. 4.

As used herein, the term "virtual cluster," refers to a cluster of loosely coupled virtual machines that cooperate to integrate services, resources, or the like. The virtual cluster provides access to services, resources, and the like, to devices external to the hardware cluster. The virtual cluster otherwise appears to external devices as a single entity on the network. Each virtual machine within the virtual cluster is referred to as a member or node of the virtual cluster. The nodes of a virtual cluster may be virtual machines and/or virtual traffic managers that may part of the same virtual cluster. Virtual nodes in the same virtual cluster may be hosted on separate physical blade servers or network computing devices.

As used herein, the term "virtual traffic manager," refers to a network traffic manager operating in, or as, a virtual machine being managed by a hypervisor. A virtual traffic manager provides network traffic management services such as, load balancing, application access control, Secure Sockets Layer processing, bandwidth shaping, or the like. Virtual traffic managers may be associated with a virtual cluster and thus operating as a virtual node in a virtual cluster.

As used herein, the term "hypervisor node," refers to a hardware node of a hardware cluster that include a hypervisor for hosting, managing, or supervising, one or more virtual machines and/or virtual traffic managers. In at least one of the various embodiments, hypervisor nodes that host virtual traffic managers may include management control plane applications and/or other traffic management modules that enable the hypervisor nodes to participate in network traffic management.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards upgrading hypervisors operating in hardware clusters that may be hosting one or more virtual clusters of virtual traffic managers. In at least one of the various embodiments, the virtual clusters may be arranged to span multiple computing devices in the hardware cluster. In at least one of the various embodiments, by spanning the virtual clusters across multiple hardware nodes, the virtual cluster may remain operative while one or more hardware nodes may be upgraded. Furthermore, the process may be repeated, enabling the entire hardware cluster to be upgraded, one hardware node at a time, without suspending the operation of the virtual clusters.

In at least one of the various embodiments, the hypervisor may include a management control plane for virtual clusters of virtual traffic managers. In at least one of the various embodiments, the hypervisors running on the hardware nodes may manage the lower level networking traffic topology (e.g., Open Systems Interconnection Layer 1 and Layer 2) while the virtual traffic managers may manage the higher level network processing (e.g., OSI Layer 3 through Layer 7).

In at least one of the various embodiments, the hypervisor based management control planes may interface with the virtual clusters and virtual traffic manager's using a pluggable translation module that enables messages and data to be mapped between the traffic management interfaces of the hypervisors and the virtual traffic managers. In at least one of the various embodiments, the pluggable translation modules may enable different versions of hypervisor based management control planes and virtual traffic managers to communicate and cooperatively manage network traffic.

Illustrative Operating Environment

FIG. 1 shows components of a non-limiting example of an environment 100 in which the described embodiments may be practiced. Not all of the components may be required to practice the various embodiments, and variations in the arrangement and type of the components may be made without departing from the spirit or scope of the various embodiments. FIG. 1 illustrates a wide area network, such as network 102, that enables communication between client device 106, host server device 104, local area network (LAN) 112 and data center 108 where at least one network computing device, such as blade server 110 is deployed. Switch 114 connects and enables communication between network 102 and data center 108. In one embodiment, blade servers 110 may be members of one or more hardware clusters. Each hardware cluster 118 may appear to switch 114 as a single network entity, having a single network address. For instance, each hardware cluster may have a unique Open Systems Interconnection (OSI) Layer 2 (L2) network address. Also, in at least one of the various embodiments, each blade server may include a hypervisor for managing one or more virtual traffic managers that may be arranged into virtual clusters. In at least one of the various embodiments, one or more virtual clusters that include virtual traffic managers may be deployed on blade servers 110.

Figure 2:
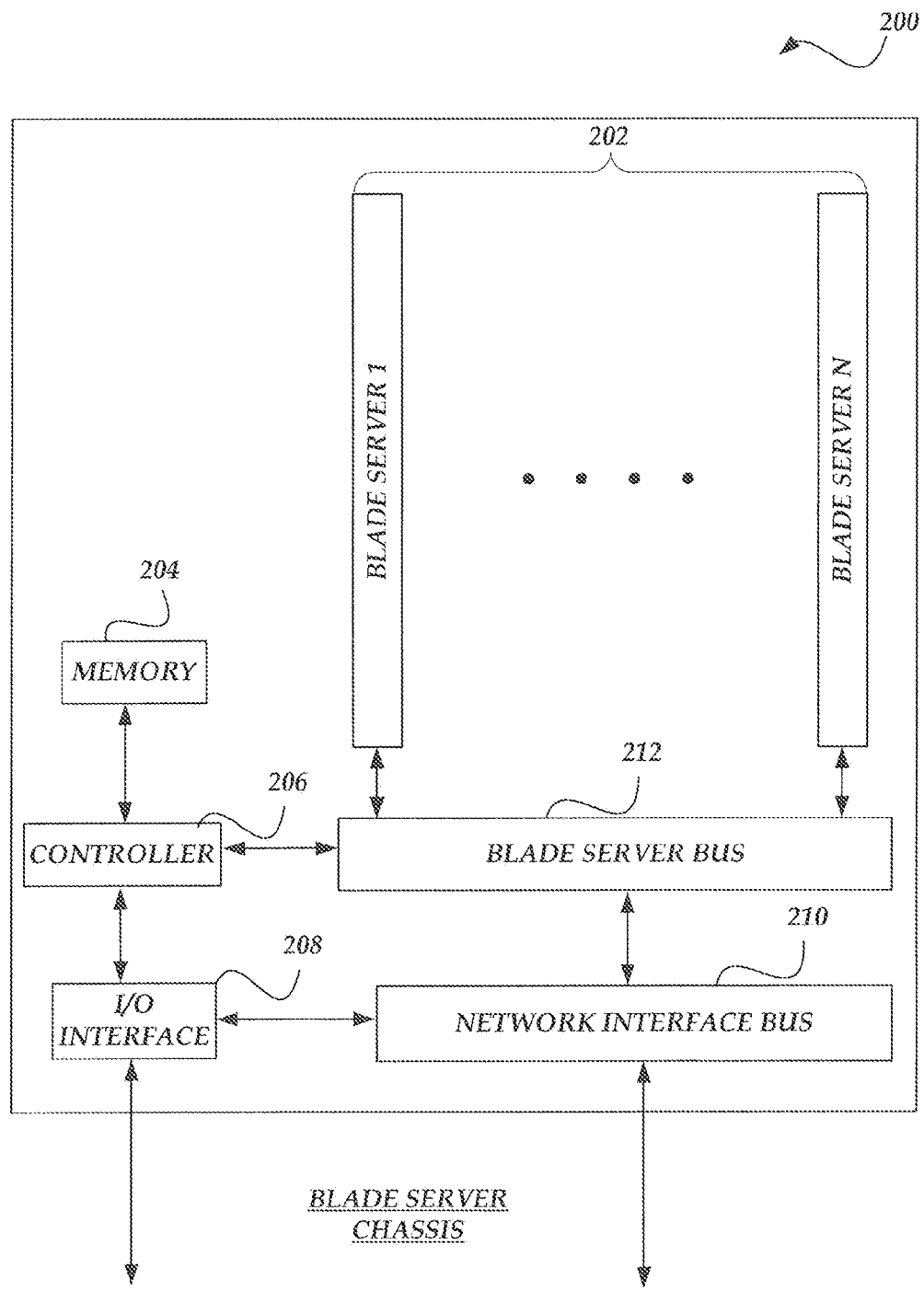
FIG. 2 illustrates a schematic overview of a chassis for enabling the operation of multiple blade servers, wherein each blade may operate as a cluster member.

FIG. 2 shows an overview of a non-limiting example of a blade server chassis 200. Not all of the components may be required to practice the various embodiments, and variations in the arrangement and type of the components may be made without departing from the spirit or scope of the various embodiments. Blade server Chassis 200 includes controller 206 in communication with memory 204, Input/Output (I/O) interface 208, network interface bus 210 and blade server bus 212. Typically, a hardware cluster of blades comprises all of the blades located in a blade server chassis, although a hardware cluster may comprise any subset of blades on a blade server chassis, or blades from more than one blade server chassis. Although not shown, blade server bus 212 may include multiple slots for blade servers 202. Also, blade server bus 212 can be arranged to support any one of several bus architectures, including, but not limited to, HyperTransport™, Fibre Channel, Peripheral Component Interconnect (PCI), Integrate Drive Electronics (IDE), Industry Standard Architecture (ISA), Advanced Graphic Port (AGP), Firewire, Small Computer Serial Interface (SCSI), Universal Serial Bus (USB), Thunderbolt™, and the like.

Figure 3:
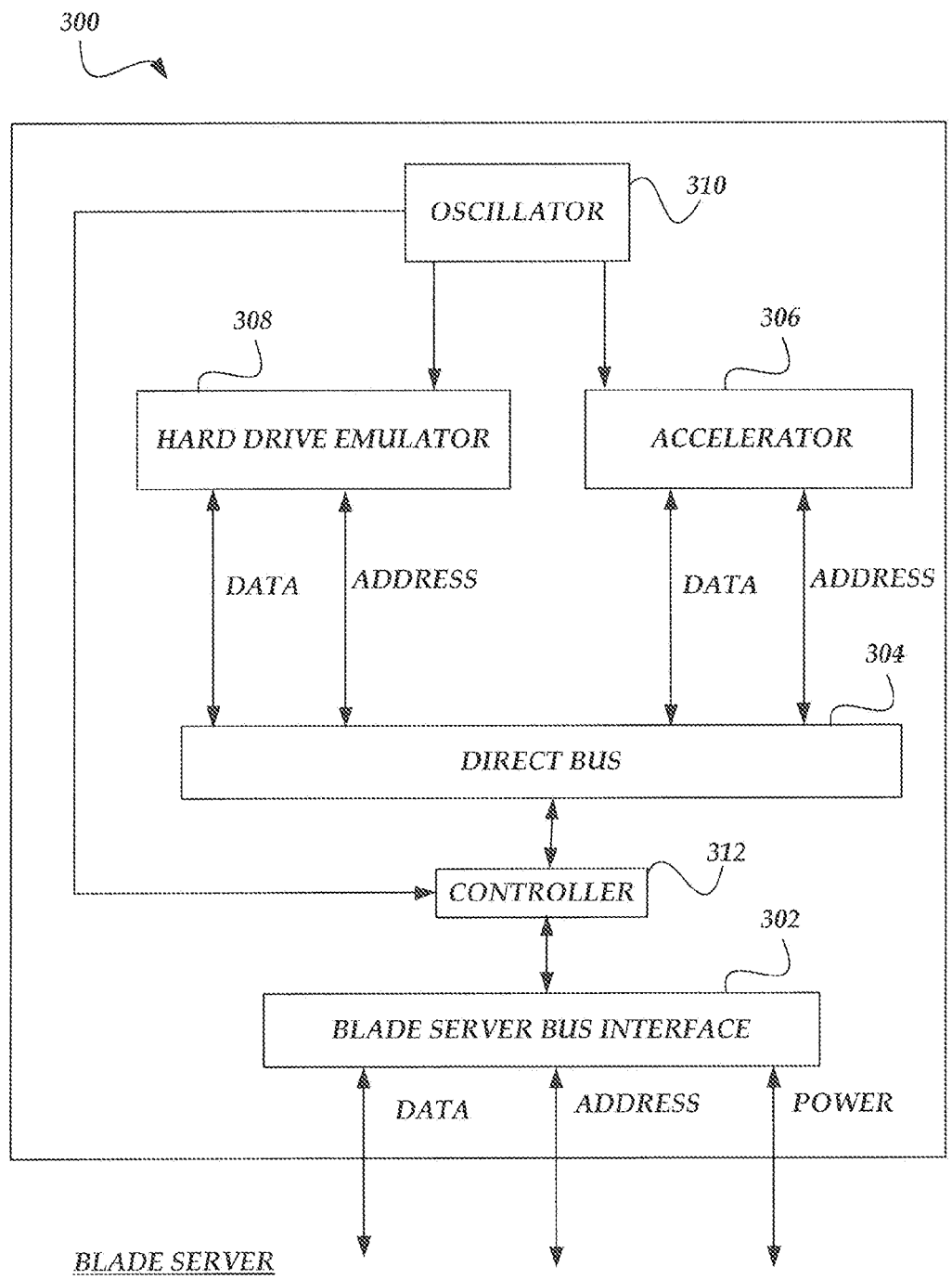
FIG. 3 shows a schematic overview of a card for enabling the operation of a blade server with a hard drive emulator and an accelerator for cryptographic functions.

FIG. 3 illustrates one embodiment of blade server card 300 that is employable as a blade server within FIG. 2. Not all of the components may be required to practice the described embodiments, and variations in the arrangement and type of the components may be made without departing from the spirit or scope of the described embodiments. Controller 312 is coupled to direct bus 304, which enables communication of data and addresses with hard drive emulator 308 and accelerator 306. In at least one of the various embodiments, almost all of an application may be stored in hard drive emulator 308 for relatively quick access by logical actions performed with controller 312, in at least one of the various embodiments, direct bus 304 can employ a bus architecture, including, but not limited to, HyperTransport™, Fibre Channel, IDE, USB, ISA, PCI, AGP, SCSI, Firewire, Serial, Thunderbolt™, and the like. However, since, in at least one of the various embodiments, a relatively small amount of data may be communicated between accelerator 306 and an application operating in controller 312 and hard drive emulator 308 (often 100 bytes or less), a relatively low speed bus architecture may be employed with direct bus 304, in the at least one of the various embodiments.

Controller 312 may be coupled to and enable communication over direct bus 304. Controller 312 is also coupled to blade server bus interface 302, which may enable communication of data and addresses. In at least one of the various embodiments, blade server bus interface 302 receives power for blade server card 300 and operates as a PCI bus. Additionally, oscillator 310 is coupled to controller 312, hard drive emulator 308 and accelerator 306 to enable the synchronization of data and addresses communicated over direct bus 304. Additionally or alternatively, a blade server card 300 may include a physical hard disk drive.

Also, controller 312 may be provided in any one of several types of devices, including, but not limited to, CPU, microcontroller, Field Programmable Gate Array (FPGA) Programmable Logic Device (PLD), Application Specific Integrated Circuit (ASIC), or the like.

Figure 4:
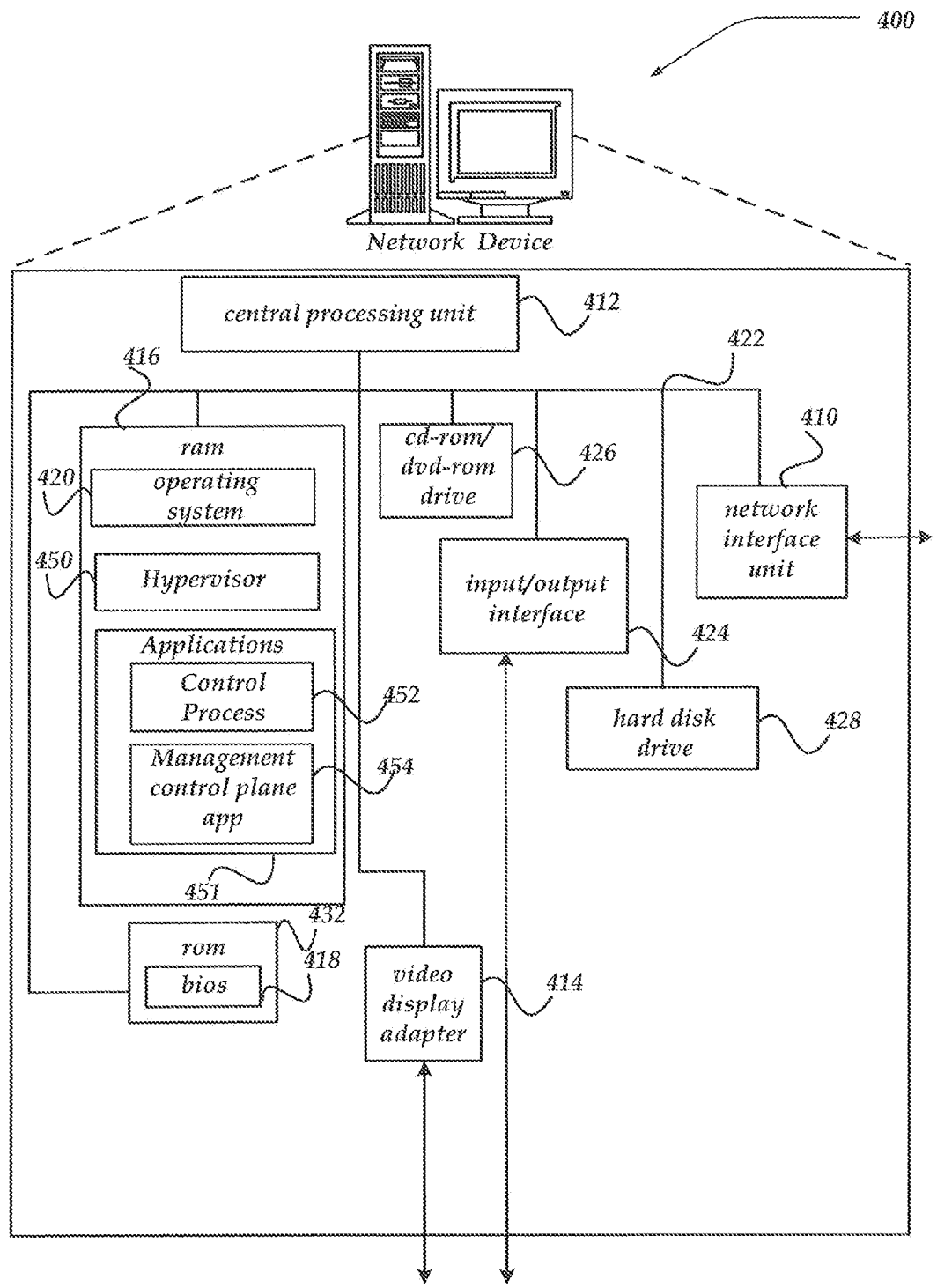
FIG. 4 illustrates a network device as another embodiment of a cluster member.

As noted, hardware cluster members, and hardware cluster architectures are not constrained to blade server architectures. Thus, for example, FIG. 4 illustrates a schematic overview of an embodiment of network device 400 that is employable as a member of a hardware cluster. In at one of the various one embodiments, network device 400 may include a stateful network device, such as a traffic management device. A stateful network device maintains information about a transport layer of a networking framework, such as, OSI layer 4, TCP layer of TCP/IP, or the like. Additionally or alternatively, network device 400 may include a stateless network device that maintains data link and/or network layer information, such as OSI layer 2, OSI layer 3, or the like. Network device 400 may include many more or less components than those shown. The components shown, however, are sufficient to disclose an illustrative embodiment. Network Device 400 may replace blade server 110 of FIG. 1 in a similar system. Further, in at least one of the various embodiments, any tasks or functionality performed by network device 400 may be performed by the blade server 110 (and vice versa). Network Device 400 may be a server, a traffic management device, application server, or the like. One embodiment of the process performed by at least some components of network device 400 is described in more detail in conjunction with FIGS. 5-13.

In at least one of the various embodiments, network device 400 includes at least one central processing unit 412 (CPU)—each CPU 412 having one or more processing cores, video display adapter 414, and a mass memory, all in communication with each other via bus 422. Moreover, one or more CPU's 412 (and/or cores within each unit 412), may replace (or supplement) blade server 110. The mass memory generally includes RAM 416, ROM 432, bios 418, and one or more permanent mass storage devices, such as hard disk drive 428, tape drive, optical drive, and/or floppy disk drive. The mass memory stores operating system 420 for controlling the operation of network device 400. Mass memory 420 also stores hypervisor 450 for managing and controlling the operation of virtual machines (virtual guests) and virtual traffic managers operating within a virtualized computing environment.

In at least one of the various embodiments, network device 400 may also communicate with switch 114, network 102, or some other communications network via one or more network interface units 410, which is constructed for use with various communication protocols including the TCP/IP protocol. Network interface unit 410 is sometimes known as a transceiver, transceiving device, or network interface card (NIC); and where network device 400 includes more than one processing unit 412 (or a unit 412 has more than one core), each unit 412 (and/or core) may use the same single network interface unit 410 or a plurality of units 410.

The mass memory 416, 426, 428, and 432 described herein and shown in FIG. 4 illustrate another type of computer-readable media, namely computer readable or processor readable storage media, which are examples of machine-readable storage media. Computer readable storage/machine-readable storage media may include volatile (transitory), non-volatile (non-transitory), removable, and non-removable media implemented in any method or technology for storage of information, such as computer readable/machine-executable instructions, data structures, objects, containers, program modules, software, or other data, which may be obtained and/or executed by a processor, such as at least one central processing unit (CPU) 412, to perform actions, including one or more portions of exemplary processes 1000, 1100, 1200 and/or 1300 of FIGS. 10-13. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, including data and/or computer/machine-executable instructions, and which can be accessed by a computing device.

The mass memory may also store other types of program code and data as applications 451, which may be loaded into mass memory and run on operating system 420. Examples of applications 451 may include web browser, email client/server programs, routing programs, schedulers, web servers, calendars, database programs, word processing programs, Hyper Text Transfer Protocol (HTTP) programs, Real-Time Streaming Protocol (RTSP) programs, security programs, and any other type of application program. Applications 451 also include control process (CP) 452 and management control plane application 454.

Network device 400 may also include a Simple Mail Transfer Protocol (SMTP) handler application for transmitting and receiving e-mail, an HTTP handler application for receiving and handing HTTP requests, an RTSP handler application for receiving and handing RTSP requests, and an HTTPS handler application for handling secure connections. The HTTPS handler application may initiate communication with an external application in a secure fashion. Moreover, network device 400 may further include applications that support virtually any secure connection, including TLS, TTLS, EAP, SSL, IPSec, or the like.

Network device 400 may also include input/output interface 424 for communicating with external devices, such as a mouse, keyboard, scanner, or other input/output devices not shown in FIG. 4. Likewise, network device 400 may further include additional mass storage facilities such as cd-rom/dvd-rom drive 426, hard disk drive 428, a a flash memory drive (not shown). Hard disk drive 428 may be utilized to store, among other things, application programs, databases, data, program modules, objects, containers, software, and the like in the same manner as the other mass memory components described above.

In one embodiment, the network device 400 may include at least one Application Specific Integrated Circuit (ASIC) chip (not shown) coupled to bus 422. The ASIC chip can include logic that performs some or all of the actions of network device 400. For example, in one embodiment, the ASIC chip can perform a number of packet processing functions for incoming and/or outgoing packets.

In one embodiment, network device 400 can further include one or more field programmable gate arrays (FPGA) (not shown), instead of, or in addition to, the ASIC chip. A number of functions of network device 400 can be performed by the ASIC chip, the FPGA, by CPU 412 with instructions stored in memory, or by any combination of the ASIC chip, FPGA, and a CPU.

Control Process 452 includes any component configured to perform upgrading of hypervisors that may be associated with a hardware cluster of network devices. Embodiments utilizing control process 452 are illustrated in FIGS. 5-13.

Management control plane application 454 includes any component for performing hardware/virtual cluster specific processing. For instance, when network device 400 comprises a blade server, management control plane application 454 may perform processing including, but not limited to, file sharing, Web page serving, caching, transcoding, streaming audio, streaming video, load balancing and failover management, and other network technologies typically implemented by a cluster architecture. When network device 400 comprises a server computer, management control plane application 454 may include, for example, file and print sharing services, in at least one of the various embodiments, management control plane application 454 may control network traffic management services, including processing and forwarding network traffic to virtual traffic managers operating as part of virtual clusters.

While network device 400 is shown to include control process 452 and management control plane application 454, in alternate embodiments, at least some of these components may not be included and may be optional, and/or alternate or other components may be included.

System Overview

Figure 5:
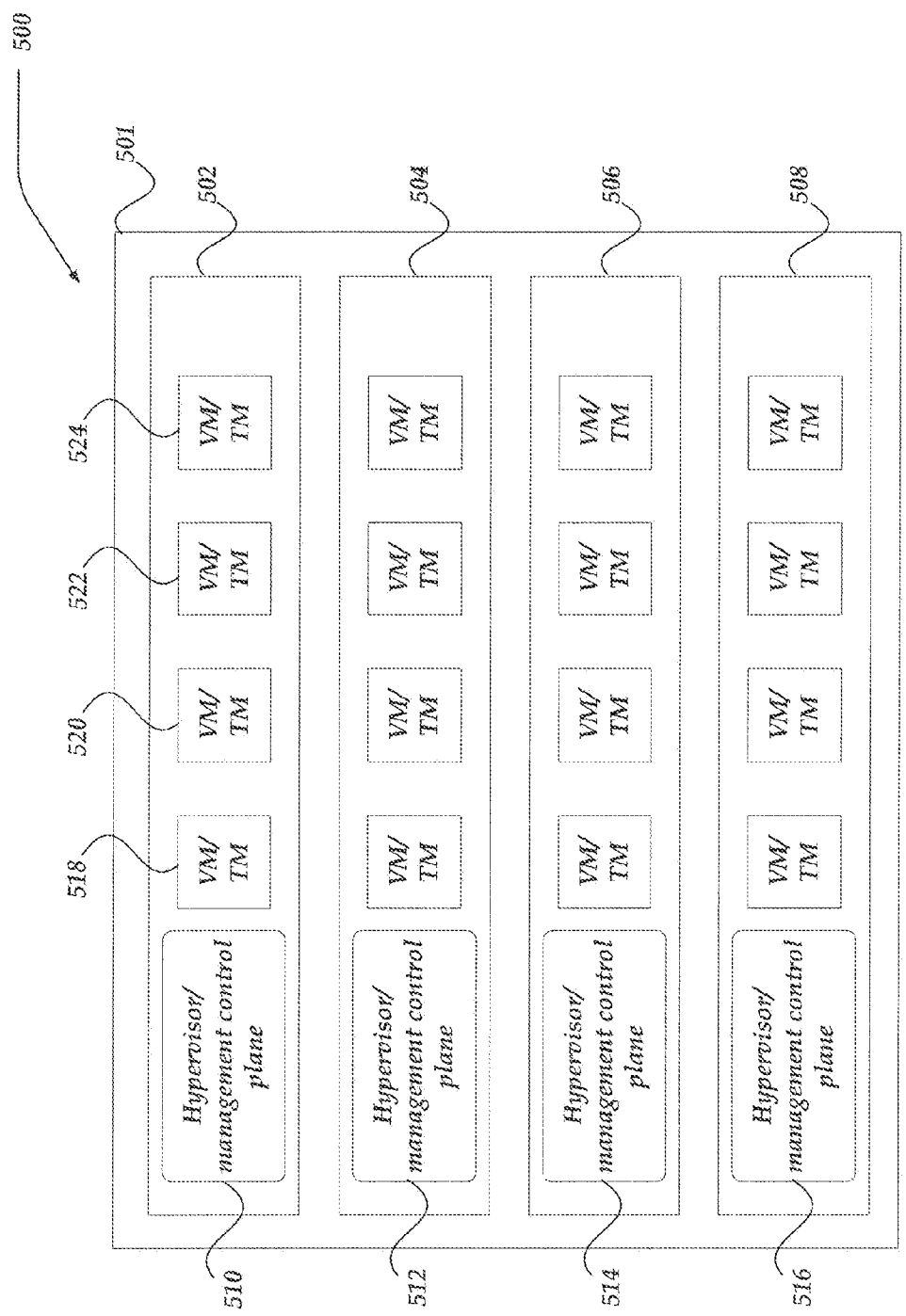
FIG. 5 shows a logical overview of a cluster of blade servers hosting hypervisors and virtual traffic managers in accordance with the embodiments.

FIG. 5 shows a logical overview of at least one of the various embodiments of blade server hardware cluster 500 that may be hosting hypervisors and virtual traffic. In at least one of the various embodiments, blade server cluster 500 may be included in a single blade server chassis, such as blade server chassis 501. In another embodiment, blade server cluster 500 may be implemented using network devices and/or blades servers operating separately from a chassis. In at least one of the various embodiments, blade server cluster 500 includes blade servers 502-508. Further, each of blade servers 502-508 may include a hypervisor, such as hypervisors 510-516. In at least one of the various embodiments, hypervisors 510-516 may include a management control plane application. In at least one of the various embodiments, more (or less) blade servers may be employed than the four illustrated in FIG. 5.

Also, in at least one of the various embodiments, each blade server may include one or more virtual machines managed by their respective hypervisors. In at least one of the various embodiments, the virtual traffic managers may hosted on the blade servers. In at least one of the various embodiments, blade server 502 may be hosting virtual machines/virtual traffic managers 518-524 running under the control and management of hypervisor 510. In at least one of the various embodiments, blade server 504-508 may likewise host one or more virtual machines that may be managed by their respective hypervisors 512-516. One of ordinary skill in the art can appreciate that more (or less)

virtual machines as depicted in FIG. 5 may be hosted on a blade servers and/or managed by a hypervisor.

Figure 6:
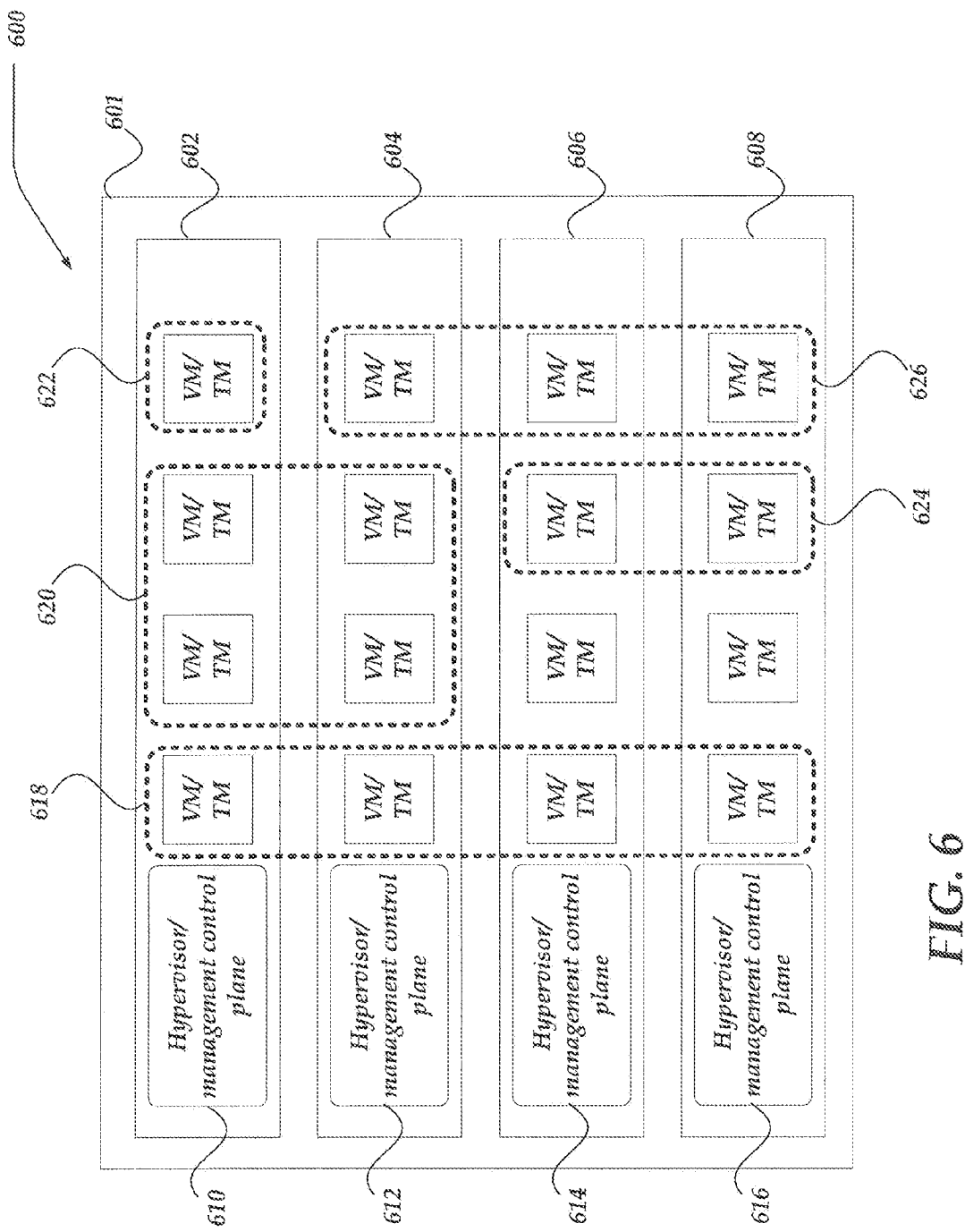
FIG. 6 illustrates a logical overview of a cluster of blade servers hosting hypervisors and virtual traffic managers with some virtual traffic managers operating in virtual clusters in accordance with the embodiments.

FIG. 6 shows a logical overview of at least one of the various embodiments of blade server cluster 600 that may be hosting hypervisors and virtual traffic managers with some virtual traffic managers operating in virtual clusters. In a at one of the various embodiments, blade server cluster 600 may be included in a single blade server chassis, such as blade server chassis 601. In another embodiment, blade server cluster 600 may be implemented using network devices and/or blades servers operating separately from a chassis. In at least one of the various embodiments, blade server cluster 600, includes blade servers 602-608. Further, each of blade servers 602-608 may include a hypervisor, such as hypervisors 610-616. In at least one of the various embodiments, hypervisors 610-616 may include a management control plane application. In at least one of the various embodiments, more (or less) blade servers may be employed than the four illustrated in FIG. 6.

Also, in at least one of the various embodiments, each blade server may include one or more virtual machines managed by their respective hypervisors. In at least one of the various embodiments, virtual traffic managers may hosted on the blade servers. In at least one of the various embodiments, blade servers 602-608 may be hosting one or more virtual machines that may be managed by their respective hypervisors 612-616. One of ordinary skill in the art will appreciate that more (or less) virtual machines as depicted in FIG. 6 may be hosted on a blade servers and/or managed by a hypervisor.

In at least one of the various embodiments, the virtual machines and/or virtual traffic managers hosted on blade servers 602-608 may be arranged to operate as virtual clusters. In at least one of the various embodiments, a virtual cluster may include one or more virtual machines that may be hosted on the same or separate blade servers. Further, in at least one of the various embodiments, the virtual machines and/or virtual traffic managers may be supervised by hypervisors operating on the blade server that may be hosting the virtual machines.

In at least one of the various embodiments, virtual cluster 618 may include four virtual machines/virtual traffic managers that may be hosted on four different blade servers (e.g., blade servers 602-608) such that the virtual cluster spans four hardware nodes. And, in at least one of the various embodiments, each virtual machine/virtual traffic manager may be supervised by one of four separate hypervisors (e.g., hypervisors 610-616).

Likewise, in at least one of the various embodiments, virtual cluster 620 may include four virtual machines/virtual traffic managers that may be hosted on two different blade servers (e.g., blade servers 602-604). And, in at least one of the various embodiments, each virtual machine/virtual traffic manager may be supervised by one of two separate hypervisors (e.g., hypervisors 610-612).

Also, in at least one of the various embodiments, virtual cluster 622 may include a single virtual machine/virtual traffic manager that may be hosted on one blade server (e.g., blade server 602). And, in at least one of the various embodiments, the virtual machine/traffic manager may be supervised by a hypervisors (e.g., hypervisor 610).

In at least one of the various embodiments, virtual cluster 624 may include two virtual machines/virtual traffic managers that may be hosted on two different blade servers (e.g., blade servers 606-608) such that the virtual cluster spans two hardware nodes. And, in at least one of the various embodiments, each virtual machine/virtual traffic manager may be supervised by one of two separate hypervisors (e.g., hypervisors 614-616).

In at least one of the various embodiments, virtual cluster 626 may include three virtual machines/virtual traffic managers that may be hosted on three different blade servers (e.g., blade servers 604-608) such that the virtual cluster spans three hardware nodes. And, in at least one of the various embodiments, each virtual machine/virtual traffic manager may be supervised by one of three separate hypervisors hypervisors 612-616).

Figure 7:
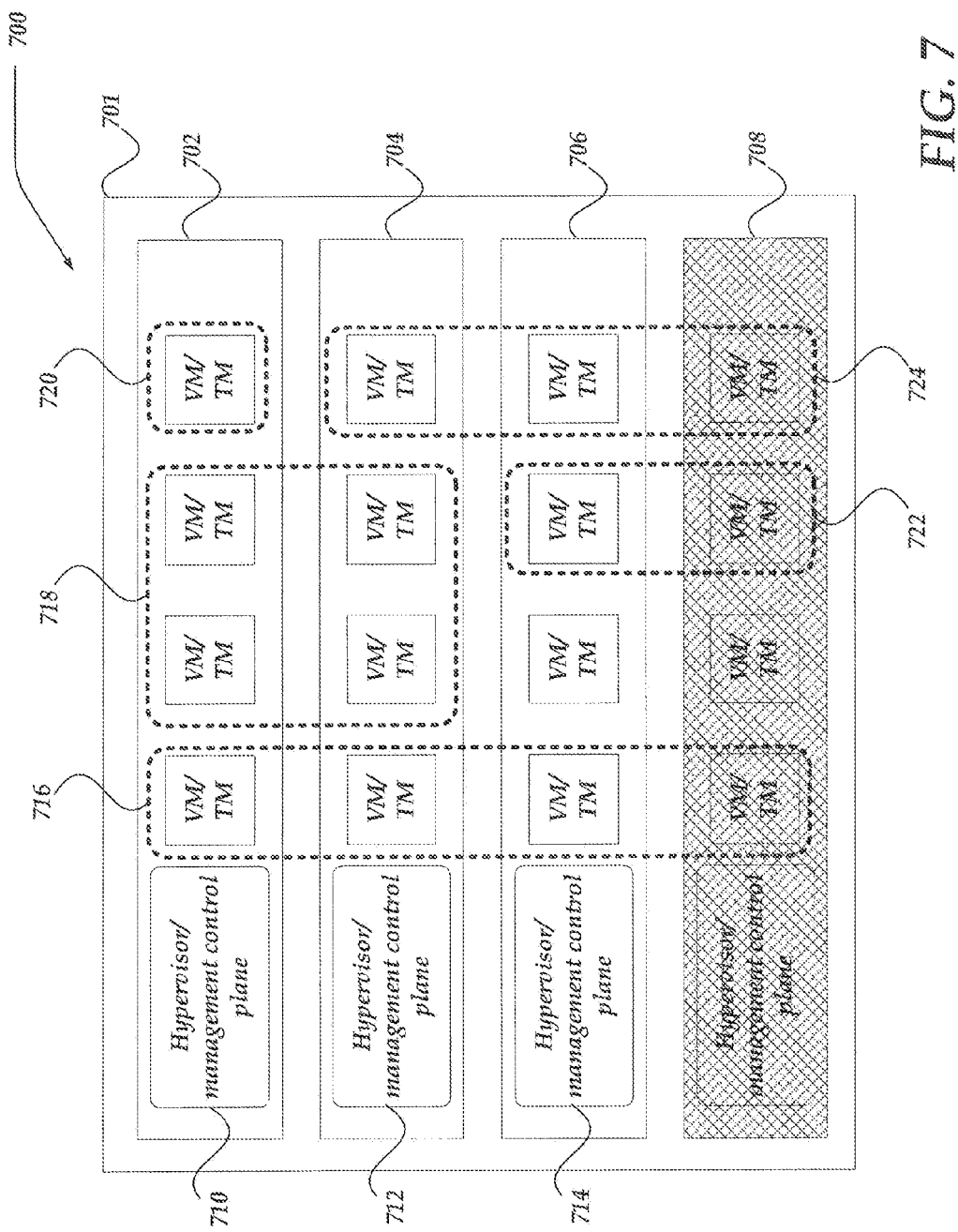
FIG. 7 shows a logical overview illustrating removing one blade server from service in a cluster of blade servers hosting hypervisors and virtual traffic managers with some virtual traffic managers operating in virtual clusters in accordance with the embodiments.

FIG. 7 shows a logical overview for at least one of the various embodiments of blade server cluster 700 having blade server 708 removed from service for upgrading. In at least one of the various embodiments, blade server cluster 700 may be included in a single blade server chassis, such as blade server chassis 701. In another embodiment, blade server cluster 700 may be implemented using network devices and/or blades servers operating separately from a chassis. In at least one of the various embodiments, blade server cluster 700, includes blade servers 702-708. Further, each of active blade servers 702-706 may include a hypervisor, such as hypervisors 710-714. In at least one of the various embodiments, hypervisors 710-714 may include a management control plane application. In at least one of the various embodiments, more (or less) blade servers may be employed than the four illustrated in FIG. 7.

Also, in at least one of the various embodiments, each blade server may include one or more virtual machines managed by their respective hypervisors. In at least one of the various embodiments, virtual traffic managers may hosted on the blade servers. In at least one of the various embodiments, blade servers 702-706 may be hosting one or more virtual machines that may be managed by their respective hypervisors 710-714. One of ordinary skill in the art can appreciate that more (or less) virtual machines than shown in FIG. 7 may be hosted on a blade servers and/or managed by a hypervisor.

In at least one of the various embodiments, the virtual machines and/or virtual traffic managers hosted on blade servers 702-708 may be arranged to operator as virtual clusters. In at least one of the various embodiments, a virtual cluster may include one or more virtual machines that may be hosted on the same or separate blade servers. Further, in at least one of the various embodiments, the virtual machines and/or virtual traffic managers may be supervised by hypervisors operating on the blade server that may be hosting the virtual machines.

In at least one of the various embodiments, virtual cluster 716 may at one time have included four virtual machines/virtual traffic managers that may be hosted on four different blade servers (e.g., blade servers 702-708). However, because blade server 708 has been withdrawn from service (e.g., as part of an upgrade process), three virtual machines/virtual traffic managers of virtual cluster 716 may be operating. And, in at least one of the various embodiments, each operating virtual machine/virtual traffic manager may be supervised by one of three separate hypervisors (e.g., hypervisors 710-714).

Likewise, in at least one of the various embodiments, virtual cluster 718 may include four virtual machines/virtual traffic managers that may be hosted on two different blade servers (e.g., blade servers 702-704). And, in at least one of the various embodiments, each virtual machine/virtual traffic manager may be supervised by one of two separate hypervisors (e.g., hypervisors 710-712).

Also, in at least one of the various embodiments, virtual cluster 720 may include a single virtual machine/virtual traffic manager that may be hosted on one blade server (e.g., blade server 702). And, in at least one of the various embodiments, the virtual machine/virtual traffic manager may be supervised by a hypervisor (e.g., hypervisor 710).

In at least one of the various embodiments, virtual cluster 722 may have at one time included two virtual machines/virtual traffic managers that may be hosted on two different blade servers (e.g., blade servers 706-708). However, because blade server 708 has been withdrawn from service (e.g., as part of an upgrade process) one virtual machine/virtual traffic manager of virtual cluster 722 may be operating. And, in at least one of the various embodiments, the operating virtual machine/virtual traffic manager may be supervised by hypervisor 714.

In at least one of the various embodiments, virtual cluster 724 may have at one time included three virtual machines/virtual traffic managers that may be hosted on three different blade servers (e.g., blade servers 704-708). However, because blade server 708 has been withdrawn from service (e.g., as part of an upgrade process) two virtual machines/virtual traffic managers of virtual cluster 724 may be operating. And, in at least one of the various embodiments, each virtual machine/virtual traffic manager may be supervised by one of two separate hypervisors (e.g., hypervisors 712-714).

Figure 8:
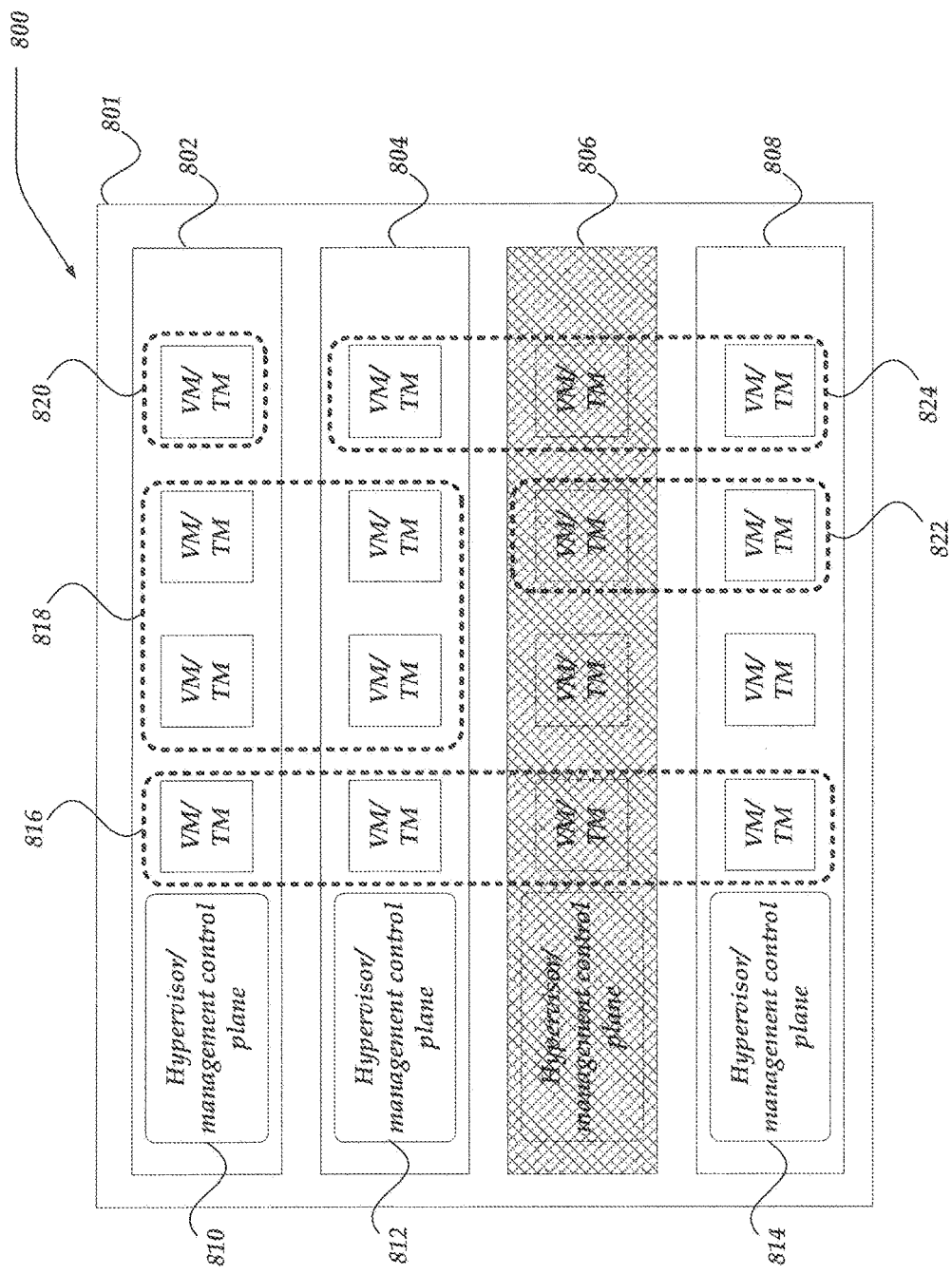
FIG. 8 illustrates a logical overview illustrating removing another blade server from service in a cluster of blade servers hosting hypervisors and virtual traffic managers with some virtual traffic managers operating in virtual clusters in accordance with the embodiments.

FIG. 8 shows a logical overview for at least one of the various embodiments of blade server cluster 800 having blade server 806 removed from service for upgrading. In at least one of the various embodiments, blade server cluster 800 may be included in a single blade server chassis, such as blade server chassis 801. In another embodiment, blade server cluster 800 may be implemented using network devices and/or blades servers operating separately from a chassis. In at least one of the various embodiments, blade server cluster 800, includes blade servers 802-808. Further, each of active blade servers 802, 804, and 808 may include a hypervisor, such as hypervisors 810-814. In at least one of the various embodiments, hypervisors 810-814 may include a management control plane application. In at least one of the various embodiments, more for less) blade servers may be employed than those shown in FIG. 8.

Also, in at least one of the various embodiments, each blade server may include one or more virtual machines managed by their respective hypervisors. In at least one of the various embodiments, virtual traffic managers may hosted on the blade servers. In at least one of the various embodiments, blade servers 802, 804, and 808 may be hosting one or more virtual machines that may be managed by their respective hypervisors 810-814. One of ordinary skill in the art will appreciate that more (or less) virtual machines than shown in FIG. 8 may be hosted on a blade servers and/or managed by a hypervisor.

In at least one of the various embodiments, the virtual machines and/or virtual traffic managers hosted on blade servers 802-808 may arranged to operator as virtual clusters. In at least one of the various embodiments, a virtual duster may include one or more virtual machines that may be hosted on the same or separate blade servers. Further, in at least one of the various embodiments, the virtual machines and/or virtual traffic managers may be supervised by hypervisors operating on the blade server that may be hosting the virtual machines.

In at least one of the various embodiments, virtual cluster 816 may at one time have included four virtual machines/traffic managers that may be hosted on four different blade servers (e.g., blade servers 802-808). However, because blade server 806 has been withdrawn from service (e.g., as part of an upgrade process) three virtual machines/traffic managers of virtual cluster 816 may be operating. And, in at least one of the various embodiments, each operating virtual machine/virtual traffic manager may be supervised by one of three separate hypervisors (e.g., hypervisors 810-814).

Likewise, in at least one of the various embodiments, virtual cluster 818 may include four virtual machines/virtual traffic managers that may be hosted on two different blade servers (e.g., blade servers 802-804). And, in at least one of the various embodiments, each virtual machine/traffic manager may be supervised by one of two separate hypervisors (e.g., hypervisors 810-812).

Also, in at least one of the various embodiments, virtual cluster 820 may include a single virtual machines/virtual traffic manager that may be hosted on one blade server (e.g., blade server 802). And, in at least one of the various embodiments, the virtual machine/virtual traffic manager may be supervised by a hypervisors (e.g., hypervisor 810).

In at least one of the various embodiments, virtual cluster 822 may have at one time included two virtual machines/Virtual traffic managers that may be hosted on two different blade servers (e.g., blade servers 806-808). However, because blade server 806 has been withdrawn from service (e.g., as part of an upgrade process) one virtual machine/virtual traffic manager of virtual cluster 822 may be operating. And, in at least one of the various embodiments, remaining operating virtual machine/virtual traffic manager may be supervised by hypervisor 814.

In at least one of the various embodiments, virtual cluster 824 may have at one time included three virtual machines/virtual traffic managers that may be hosted on three different blade servers (e.g., blade servers 804-808). However, because blade server 806 has been withdrawn from service (e.g., as part of an upgrade process) two virtual machines/virtual traffic managers of virtual cluster 824 may be operating, one hosted blade server 804 and one hosted on blade server 808. And, in at least one of the various embodiments, each virtual machine/virtual traffic manager may be supervised by one of two separate hypervisors (e.g., hypervisors 812-814).

FIGS. 6-8 show how, in at least one of the various embodiments, virtual clusters of virtual traffic managers may be arranged to enable upgrading of hypervisors in a hardware cluster. In at least one of the various embodiments, if the virtual clusters span multiple hypervisor nodes, one or more hypervisor node may be taken down and upgraded without suspending the virtual cluster. In at least one of the various embodiments, this may enable hypervisor node upgrades to occur such that clients outside the hardware cluster may continue to operate and receive services from the virtual clusters during the upgrade process.

Figure 9:
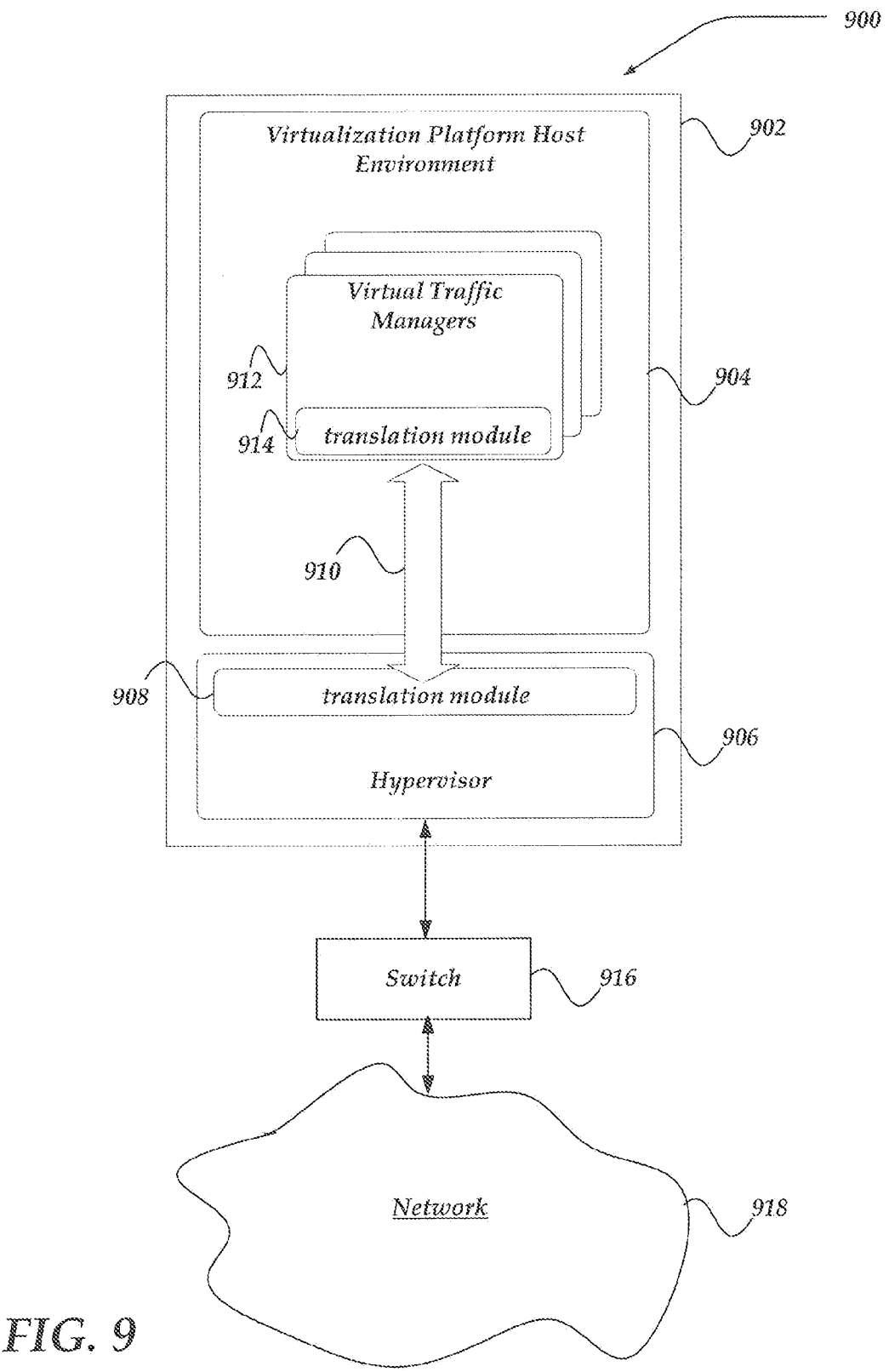
FIG. 9 shows a logical overview illustrating a single blade server operating in accordance with the embodiments.

FIG. 9 shows a logical overview illustrating, for at least one of the various embodiments, blade server 900 arranged to operate as a network traffic manager. In at least one of the various embodiments, blade server 902 may be arranged to include hypervisor 906. Hypervisor 906 may be managing and/or supervising virtualization platform host environment 904. In at least one of the various embodiments, virtualization platform host environment 904 may contain one or more virtual machines, such as virtual traffic manager(s) 912. In at least one of the various embodiments, hypervisor 906 may include translation module 908. Also, in at least one of the various embodiments, virtual traffic manager(s) 912 may include translation module 914.

In at least one of the various embodiments, communication 910 between hypervisor 906 and virtual traffic manager

912 may pass through translation module 908 and translation module 914 before reaching each underlying component (e.g., hypervisor 906 and virtual traffic manager 912). In at least one of the various embodiments, hypervisor 906 may transmit and receive network traffic to and from switch 916. From switch 916 network traffic may reach one or more internal or external networks, such as network 918.

In at least one of the various embodiments, hypervisor 906 may receive network traffic from the switch 916 and may process OSI Layer 1 and Layer 2 of the received network traffic, if Layer 1 and Layer 2 of the network traffic may be processed by the hypervisor, the Layer 3 through Layer 7 of the network traffic may be forwarded to one or more virtual traffic managers 912. Hypervisor 906 and virtual traffic manager 912 may coordinate the forwarding the Layer 3 through Layer 7 network traffic by using their respective translation modules (e.g., translation module 908 for the hypervisor and translation module 914 for the virtual traffic manager).

Translation modules 908 and 914 may be pluggable modules that may be updated and/or upgraded independent of the hypervisors or virtual traffic managers. In at least one of the various embodiments, the translation module may be enabled to map messages, API's, data structures, or the like, between different versions of hypervisors or virtual traffic managers. Further, in at least one of the various embodiments, translation modules may support one or more version mappings. In at least one of the various embodiments, if hypervisors and virtual traffic managers communicate and/or transfer network traffic, both sides the communication may engage in a negotiation process to identify a compatible version mapping that may be supported by their respective translation modules.

In at least one of the various embodiments, during the upgrade process, different versions of hypervisors may be required to operate cooperatively. To accommodate different versions of hypervisors and/or different versions of management control plane applications, hypervisors may use a translation module to communicate with other hypervisors. Accordingly, in at least one of the various embodiments, the translation module in a hypervisor (e.g., translation module 908) may be arranged to enable different versions of hypervisors to communicate. In at least one of the various embodiments, translation module 908 may be arranged to map messages, parameters, data structures, or the like, between different versions of hypervisors.

General Operation

Figure 10:
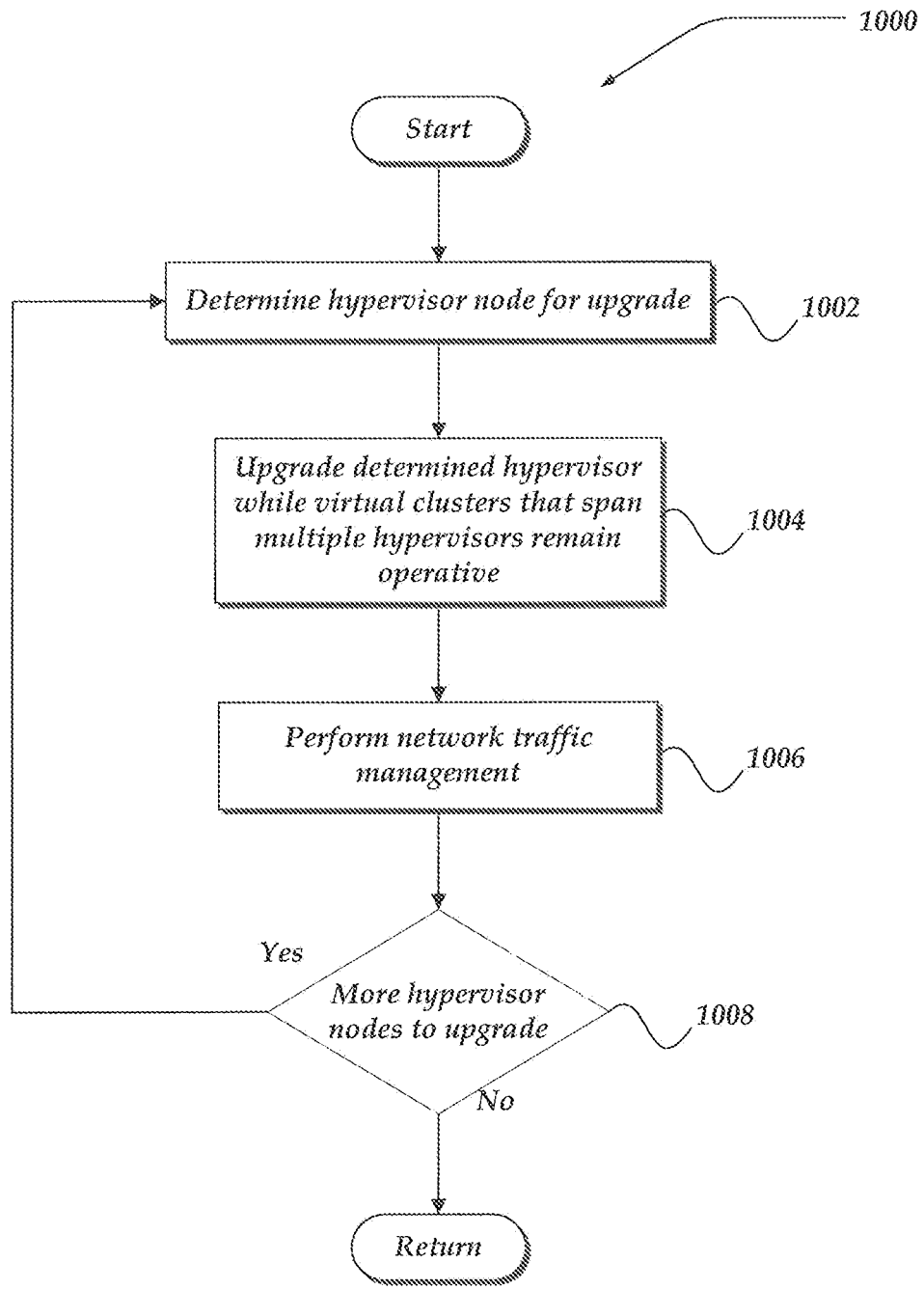
FIG. 10 illustrates a flow chart generally showing one embodiment of an overview process for upgrading hypervisors in accordance with the embodiments.

FIG. 10 shows a flow chart showing one embodiment of overview process 1000 for upgrading hypervisors that may supervise virtual traffic managers and/or virtual clusters of virtual traffic managers. After a start block, the process moves to block 1002 where the hypervisor node targeted for upgrading may be determined. In at least one of the various embodiments, the determining a hypervisor node for upgrading may be automated by one or more computer processes that monitor current operating conditions for determining if a hypervisor node should be upgraded.

In at least one of the various embodiments, a monitoring process may operate on a central command node and direct individual hypervisors to initiate the upgrade process. In at least one of the various embodiments, the individual hypervisors may monitor conditions and may independently make a determination that an upgrade may be required. Also, in at least one of the various embodiments, hypervisors may cooperatively determine if an upgrade may be required and if so, in at least one of the various embodiments, processes on the hypervisors may cooperatively determine the hypervisor node for upgrading. Or, in at least one of the various embodiments, an authorized user, such as, a network administrator may operate a user-interface to identify the hypervisor node targeted for upgrading.

In at least one of the various embodiments, the particular software that may comprise the upgrade may be determined automatically or it may be determined by a system administrator (user). In at least one of the various embodiments, candidate upgrade packages may be stored in a known location accessible by the management control plane applications and/or hypervisors. In at least one of the various embodiments, upgrade packages may be named using a naming protocol that incorporates the version of the software contained in the upgrade package. In at least one of the various embodiments, upgrade packages may use a well-known format and may contain meta-data within the upgrade package that may enable various monitoring process and users to identify the upgrade package and determine the contents and/or relevancy of the upgrade package.

Next, at block 1004 the determined hypervisor node may be upgraded. In at least one of the various embodiments, to minimize disruption of the traffic management services that may be provided by the hypervisor node, upgrading a hypervisor node may require several steps. In at least one of the various embodiments, one or more virtual machines hosted on the hypervisor, including virtual traffic managers, may require suspension and/or termination during the upgrade step.

In at least one of the various embodiments, virtual clusters having one or more virtual machines running as guests on the hypervisor node being upgraded may remain operative if other members of the virtual cluster may be hosted by other hypervisors.

At block 1006, in at least one of the various embodiments, the hypervisor node may resume performing network traffic management services if the upgrade process for that particular hypervisor node may be complete. In at least one of the various embodiments, if the hypervisor may be hosting virtual machines (e.g., guest instances) that may members of virtual clusters, those virtual machines may rejoin their virtual clusters.

In at least one of the various embodiments, multiple hypervisor nodes may operate cooperatively as part of a hardware cluster. In at least one of the various embodiments, hypervisor nodes may be arranged in a blade server based hardware cluster emplaced in one or more blade chassis. Alternatively, in at least one of the various embodiments, hypervisor nodes may be operating in a hardware cluster comprised of separate network devices. Or, in at least one of the various embodiments, hypervisor nodes may be operating in a hardware cluster comprised of blade servers and other network devices. Often, it may be advantageous to upgrade all of the hypervisor nodes to the same software version and/or upgrade package. Therefore, in at least one of the various embodiments, an upgrade process may be arranged to upgrade multiple hypervisor nodes.

At decision block 1008, in at least one of the various embodiments, if more hypervisor nodes require upgrading, control loops back to block 1002. Otherwise, in at least one of the various embodiments, control may return to a calling process.

Figure 11:
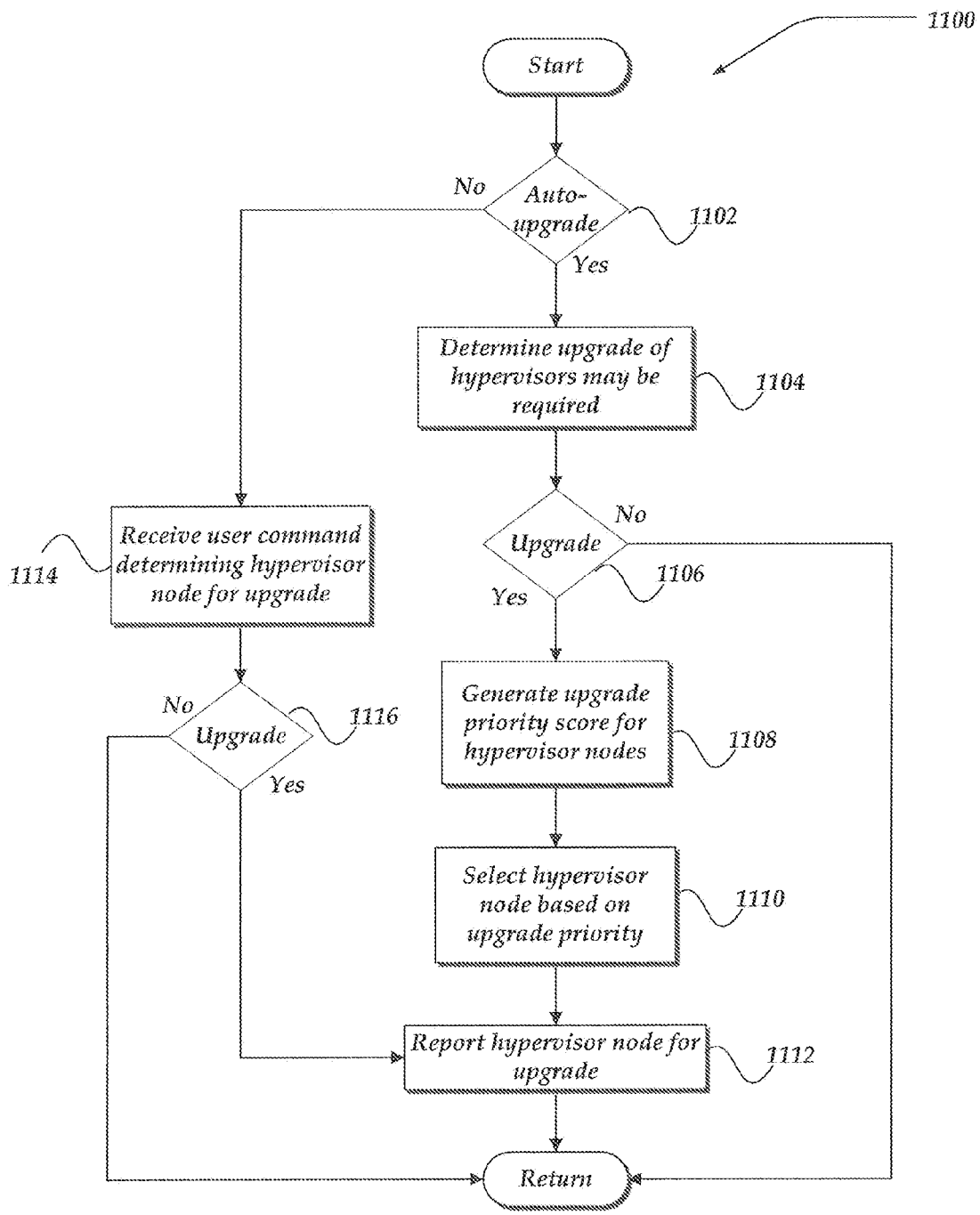
FIG. 11 shows a flow chart generally showing one embodiment of an overview process for use in determining hypervisor nodes for upgrading in accordance with the embodiments.

FIG. 11 shows a flow chart generally showing one embodiment of process 1100 for use in determining the hypervisor nodes that may be targeted for upgrading. After a start block at decision block 1102, if the hypervisor upgrade process is arranged to occur automatically, the control of process 1100 moves to block 1104. In at least one of the various embodiments, process 1100 may determine if the upgrade process may operate automatically based on configuration values that may be stored in a configuration file, database, passed in from an outside process/user-interface, or the like.

At block 1104, determine if an upgrade of hypervisor nodes may be required. In at least one of the various embodiments, an upgrade determination may be based on analysis of current operating conditions and availability of upgrade packages. In at least one of the various embodiments, current operating conditions that impact the upgrade determination may include, age and/or version of installed software, importance of available upgrade packages, volume of network traffic being processed, the type of network traffic being processes, number of active connections, average duration of connections and/or network sessions, rate of errors detected, or the like.

At decision block 1106, in at least one of the various embodiments, if the automated process determines that an upgrade may be required, the control of process 1100 moves to block 1108. Otherwise, control may be returned to a calling process.

At block 1108, in at least one of the various embodiments, upgrade priority scores may be generated for each hypervisor node. In at least one of the various embodiments, this may require executing one or more algorithms that may generate a priority score for each hypervisor nodes in the hardware cluster. In at least one of the various embodiments, hypervisor nodes may receive priority scores based on a variety of factors, including when they joined the cluster, the version of the software running on the hypervisor node, name or identifier sort order, network address, assignment by a system administrator, or the like. In at least one of the various embodiments the priority scores may be stored and retrieved as required. Further, in at least one of the various embodiments, priority scores may be generated by assigning a numeric identifier to each hypervisor node.

Also, in at least one of the various embodiments, a hypervisor node's priority score may be influenced by the role that the hypervisor node performs within the associated hardware cluster. For example, in some arrangements the hypervisor node hardware cluster may have a designated command hypervisor node. In at least one of the various embodiments, a command hypervisor node may be required to accommodate network traffic management protocols that may inherently require a command node, such as Spanning Tree Protocol. In other cases, in at least one of the various embodiments, a command hypervisor node may be designated to facilitate management of the hypervisor node hardware cluster. For example, in at least one of the various embodiments, the command hypervisor node may be arranged to host a command user-interface for operating and configuring the hypervisor nodes, virtual clusters, virtual traffic managers, or the like, that may be included in the hardware cluster. Thus, in at least one of the various embodiments, operation of the cluster may be reduced by delaying the upgrade of the command hypervisor node until other hypervisor nodes within the cluster have been upgraded. Therefore, in at least one of the various embodiments, command hypervisor nodes may be assigned an upgrade priority score that may ensure that the command hypervisor node may be the last hypervisor in the hardware cluster to be upgraded.

Next at block 1110, process 1100 may select the hypervisor node based on the upgrade priority score. At block 1112, process 1100 may report the selected hypervisor node to the calling process.

In at least one of the various embodiments, reporting that a hypervisor node has been selected for upgrade may initiate the remaining steps of the upgrade process. Also, in at least one of the various embodiments, the reporting of a hypervisor node for upgrading may be received by a process without triggering an actual upgrade. In at least one of the various embodiments, the identity of the hypervisor node that may be selected for upgrading may be reported to a system administrator. Thus, in at least one of the various embodiments, a system administrator may make the final determination as to whether to continue and/or complete the upgrade process.

At block 1114, process 1100 receives and processes the command supplied by a user for determining the hypervisor node for upgrading. At decision block 1116, if a command to upgrade a hypervisor is received, control of process 1100 moves to block 1112. Otherwise, control may be returned to the calling process. In at least one of the various embodiments, commands may be submitted by an authorized third party process such as monitoring applications, SNMP traps, or the like.

Figure 12:
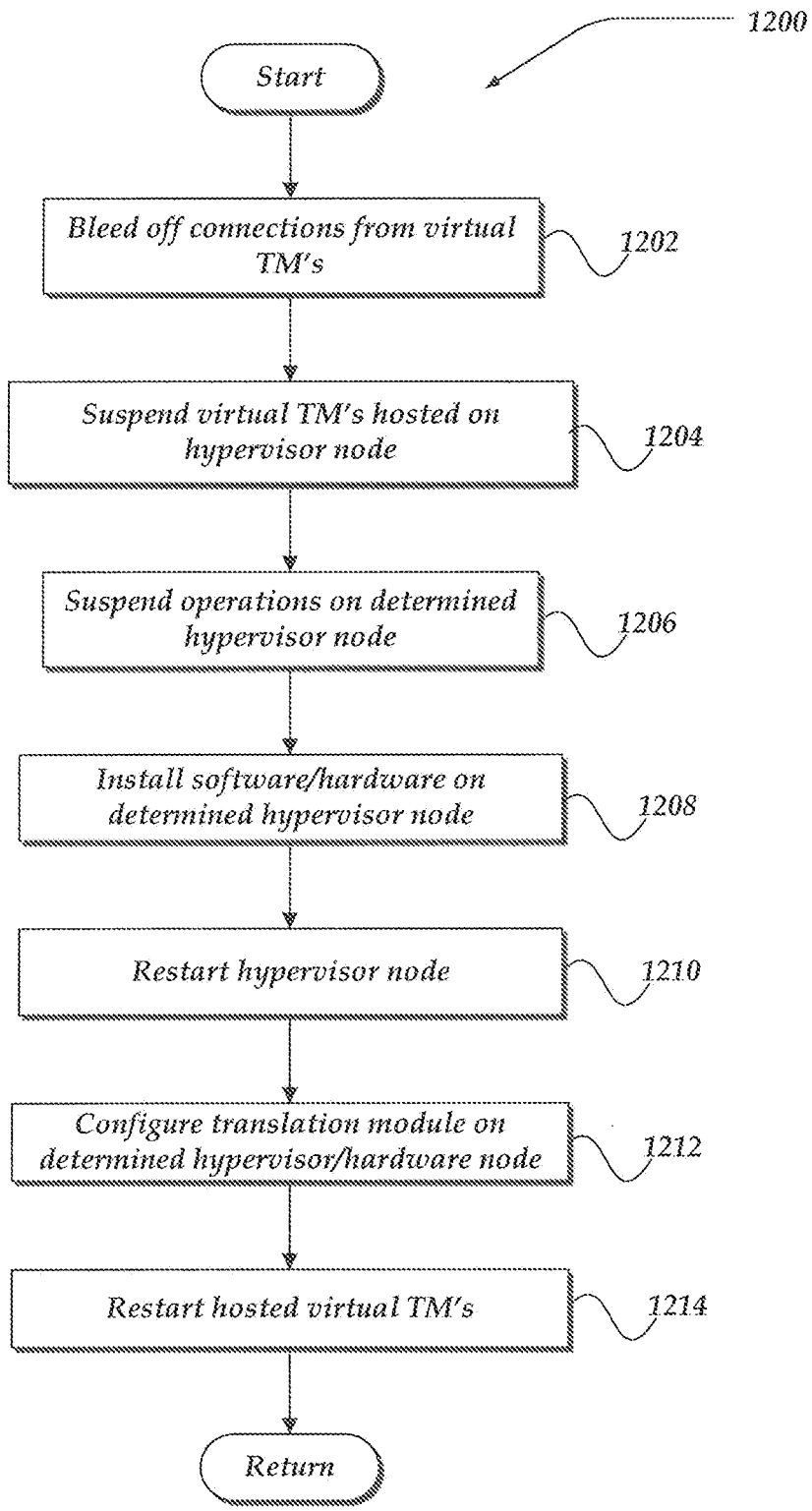
FIG. 12 illustrates a flow chart generally showing one embodiment of an overview process for use in upgrading a determined hypervisor node in accordance with the embodiments.

FIG. 12 shows a flow chart generally showing one embodiment of process 1200 for upgrading a hypervisor node. After a start block at block 1202, in at least one of the various embodiments, network connections associated with the virtual traffic managers hosted on the hypervisor node targeted for upgrade may be bled off. In at least one of the various embodiments, connections may be bled off by waiting for the current network sessions to terminate while preventing new connections from being associated with the virtual traffic managers hosted on the hypervisor node targeted for upgrading. In at least one of the various embodiments, more aggressive bleed off techniques may be used, such as actively transferring the connection state of connections effected by the hypervisor node upgrade to other traffic managers not impacted by the upgrade of the hypervisor node. In at least one of the various embodiments, if the virtual traffic manager is part of a virtual cluster, members of virtual cluster not hosted on the hypervisor node targeted for upgrading may continue to process network connections that may be directed towards the hypervisor node undergoing an upgrade. Additional bleed off techniques beyond those described herein may be applied as well.

In at least one of the various embodiments, bleeding off connections also may entail directing OSI Layer 1 and Layer 2 network traffic to hypervisor nodes other than the hypervisor node targeted for upgrade.

At block 1204, in at least one of the various embodiments, the operation of the virtual traffic managers and other virtual machines that may be hosted on the hypervisor node targeted for upgrade may be suspended. In at least one of the various embodiments, virtual traffic managers that may be a member of a virtual cluster may be informed that the suspended virtual traffic managers may be unavailable to process network traffic. In at least one of the various embodiments, the suspended virtual traffic managers may appear to other virtual cluster members as being disabled. In at least one of the various embodiments, network traffic received by the virtual cluster may be managed by the remaining operative virtual traffic managers in the virtual cluster.

At block 1206, in at least one of the various embodiments, the remaining processes that may be running on the targeted hypervisor node may be suspended as necessary for the upgrade process, in at least one of the various embodiments, these may be processes executing on the hypervisor node that may be sensitive to the upgrade process. In at least one of the various embodiments, the particular processes that require suspending may depend on the scope and purpose of the upgrade. In at least one of the various embodiments, the upgrade package may include a list of processes that may be required to suspend or shutdown for the upgrade to continue.

At block 1208, in at least one of the various embodiments, the upgrade package may be installed. Also, if the upgrade requires new or replacement hardware to be installed, a user may install the hardware while all the processes are suspended.

At block 1210, in at least one of the various embodiments, after the software and/or hardware comprising the upgrade may be installed on the hypervisor node, the hypervisor node may be restarted and/or rebooted as necessary. In at least one of the various embodiments, some upgrades may not require rebooting or restarting the hypervisor node.

At block 1212, in at least one of the various embodiments, the hypervisor node may identify, configure, and/or install the necessary translation module(s). In at least one of the various embodiments, the upgraded hypervisor node may communicate with a command hypervisor node to obtain the configuration information necessary for the hypervisor node to participate and/or cooperate with the other nodes in the hypervisor cluster.

In at least one of the various embodiments, the information exchanged between the upgraded hypervisor node and the other hypervisor nodes in the hardware cluster may be modified by the translation module if the other hypervisors may be running different versions of software that require dissimilar API's and/or data schemas. If the upgraded hypervisor node may be configured and arranged to rejoin the cluster, control may move to block 1214.

At block 1214, in at least one of the various embodiments, the hypervisor node may restart and/or reactivate virtual traffic managers and/or virtual machines that may have been suspended as part of the upgrade process. Further, in at least one of the various embodiments, the management control plane application may communicate control and/or configuration information to the hosted virtual traffic managers that causes them to make adaptations based on the upgrade.

In at least one of the various embodiments, if the virtual traffic managers may be arranged to be part of a virtual cluster, the virtual traffic managers may rejoin the virtual cluster and begin processing network traffic as part of the virtual cluster. Next, control may be returned to the calling process.

Figure 13:
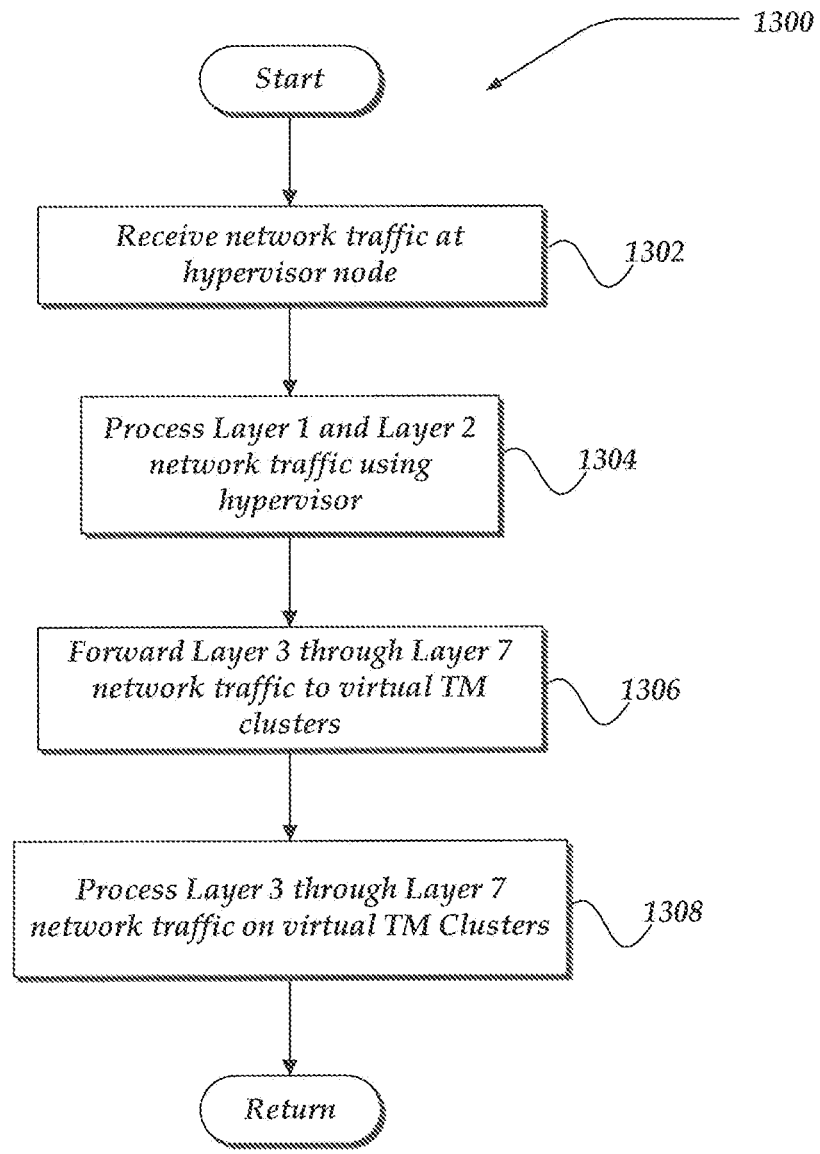
FIG. 13 shows a flow chart generally showing one embodiment of an overview process for network traffic management in accordance with the embodiments.

FIG. 13 shows a flow chart generally showing one embodiment of process 1300 for use in network traffic management using hypervisors and virtual traffic managers. After a start a block, process 1300 advances to block 1302, in at least one of the various embodiments, where the hypervisor node may receive network traffic.

At block 1304, the OSI Layer 1 and Layer 2 network traffic may be processed by the hypervisor. In at least one of the various embodiments, the hypervisor may have specialized modules for implementing a management control plane for traffic management. In at least one of the various embodiments, the traffic management duties may be bifurcated into at least two parts. In at least one of the various embodiments, the hypervisors may process the low level network traffic (OSI Level 1 and Level 2) while the virtual traffic managers that may be operating as members of virtual clusters. In at least one of the various embodiments, the virtual clusters and/or virtual traffic manager may be managed by the management control plan application(s) that may operate as part of the hypervisors.

At block 1306, in at least one of the various embodiments, the hypervisor may forward to the OSI Layer 3 through Layer 7 network traffic to the virtual traffic managers hosted on the hypervisor node. In at least one of the various embodiments, the hypervisor and the virtual traffic manager(s) may communicate through one or more translation modules.

In at least one of the various embodiments, at least bifurcating the network traffic at the lower levels may simplify the complexity of the translation modules. In at least one of the various embodiments, the data structures required for network traffic management at low levels, such as OSI Level 2, may be relatively simple and small in number compared to the data structures required by the higher levels of network traffic in the OSI stack, such as OSI Levels 3-7. These higher level layers may be employed to process complex networking protocols, including stateful protocols, such as, TCP, FTP, HTTP, or the like.

In at least one of the various embodiments, at least bifurcating the network traffic management at a low level may reduce the complexity of any translation that may be performed between different versions of the hypervisors and the virtual traffic managers. In at least one of the various embodiments, the data structures and protocol employed for low level network traffic management may be minimal and may also arrange translation modules for translating (or mapping) API's, messaging, and data structures used among different versions of the hypervisors and virtual traffic managers. In at least one of the various embodiments, translation modules enable a single hypervisor to share network traffic management duties with the virtual traffic managers having different software and hardware versions.

In at least one of the various embodiments, a hypervisor may be upgraded independent and separate from virtual traffic managers. Also, the translation modules can enable multiple virtual traffic managers having different versions to be hosted/managed by the same hypervisor.

At block 1308, in at least one of the various embodiments, the OSI Layer 3 through Layer 7 network traffic may be processed by the virtual traffic managers hosted on the hypervisor. In at least one of the various embodiments, after processing the higher level network traffic, the network traffic may be passed through the translation module in the reverse direction as necessary. Next, control may be returned to the calling process. In at least one of the various embodiments, virtual traffic managers may be operating as a member of a virtual cluster.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed is:

1. A method for upgrading one or more hypervisors in a cluster of nodes over a network with a network device that includes a hardware processor that executes instructions that perform actions, comprising:

iteratively determining the one or more hypervisors for in service upgrading to prevent interruption of communication over the network by the cluster of nodes, wherein each of the one or more hypervisors determined for in service upgrading correspond to a virtual traffic manager that is part of a virtual cluster of virtual traffic managers that spans at least two nodes and the one or more determined hypervisors are instantiated on one or more separate blade server computers, and wherein one or more non-transitory processor readable memories are configured and arranged to store instructions sufficient to implement the one or more determined hypervisors that are associated with one or more translation modules and the corresponding virtual traffic managers that are associated with one or more other translation modules, performing further actions:

deactivating operation of the one or more determined hypervisors and the one or more corresponding virtual traffic managers while the virtual cluster remains operative;

upgrading the one or more deactivated hypervisors, wherein the upgrading includes one or more of enabling inactive software code, change a configuration of running software, re-purposing the one or more deactivated hypervisors to perform one or more different functionalities, rolling back a current version of software code to a prior version, or replacement of hardware; and preventing interruption of communication over the network by the cluster of nodes by re-activating the one or more upgraded hypervisors and each corresponding virtual traffic manager for the virtual cluster; and providing in service communication between the at least one re-activated hypervisor and each corresponding virtual traffic manager, wherein the upgraded hypervisor provides management control of Layer 1 and 2 network traffic of the Open Systems Interconnect (OSI) stack, and wherein each upgraded hypervisor employs their translation module to forward OSI Layer 3 through Layer 7 network traffic to one or more other translation modules that are employed by their associated virtual traffic manager to receive the forwarded network traffic, wherein the one or more translation modules associated with each upgraded hypervisor are configured to support a negotiation process to identify a compatible version of the one or more upgraded hypervisors by mapping different versions of the one or more upgraded hypervisors that are compatible to the one or more other translation modules associated with the corresponding virtual traffic managers, and wherein different versions of candidate upgrade packages are stored in a non-transitory processor readable memory that is accessible over layers 1 and 2 by the one or more hypervisors the mapping of different versions of the candidate upgrade packages; and employing the same upgraded hypervisor to use the one or more translation modules to communicate with different versions of the one or more other translation modules of the one or more virtual traffic managers.

2. The method of claim 1, wherein upgrading the one or more hypervisors further comprises automatically upgrading one or more translation modules for the one or more upgraded hypervisors, wherein the one or more translation modules map messages and data structures between different versions of a hypervisor and the hypervisor's corresponding virtual traffic managers.

3. The method of claim 1, wherein deactivating the one or more determined hypervisors further comprises:

bleeding off one or more connections to the one or more corresponding virtual traffic managers;

suspending operation of the one or more corresponding virtual traffic managers; and suspending operation of the one or more determined hypervisors.

4. The method of claim 1 further comprising:

receiving network traffic at the one or more hypervisors;

processing at least a portion of low level network traffic on the one or more hypervisors; and forwarding at least a portion of high level network traffic to one or more virtual traffic managers that correspond to the one or more hypervisors; and processing the at least portion of the high level network traffic on the one or more virtual traffic managers that correspond to the one or more hypervisors.

5. The method of claim 1, wherein determining one or more hypervisors for upgrading further comprises:

generating an upgrade priority score for the one or more hypervisors; and determining the one or more hypervisors for upgrading based on the upgrade priority score.

6. The method of claim 1, wherein the one or more upgraded hypervisors communicate with one or more command hypervisors to obtain configuration information.

7. The method of claim 1 further comprising performing the actions of claim 1 for each other hypervisor in the cluster of nodes.

8. A network device that upgrades one or more hypervisors in a cluster of nodes comprising:

a transceiver that communicates over a network;

a memory that stores at least instructions; and a processor device that executes instructions that perform actions, including:

iteratively determining the one or more hypervisors for in service upgrading to prevent interruption of communication over the network by the cluster of nodes, wherein each of the one or more hypervisors determined for in service upgrading correspond to a virtual traffic manager that is part of a virtual cluster of virtual traffic managers that spans at least two nodes and the one or more determined hypervisors are instantiated on one or more separate blade server computers, and wherein one or more non-transitory processor readable memories are configured and arranged to store instructions sufficient to implement the one or more determined hypervisors that are associated with one or more translation modules and the corresponding virtual traffic managers that are associated with one or more other translation modules, performing further actions:

deactivating operation of the one or more determined hypervisors and the one or more corresponding virtual traffic managers while the virtual cluster remains operative;

upgrading the one or more deactivated hypervisors, wherein the upgrading includes one or more of enabling inactive software code, change a configuration of running software, re-purposing the one or more deactivated hypervisors to perform one or more different functionalities, rolling back a current version of software code to a prior version, or replacement of hardware; and preventing interruption of communication over the network by the cluster of nodes by re-activating the one or more upgraded hypervisors and each corresponding virtual traffic manager for the virtual cluster; and providing in service communication between the at least one re-activated hypervisor and each corresponding virtual traffic manager, wherein the upgraded hypervisor provides management control of Layer 1 and 2 network traffic of the Open Systems Interconnect (OSI) stack, and wherein each upgraded hypervisor employs their translation module to forward OSI Layer 3 through Layer 7 network traffic to one or more other translation modules that are employed by their associated virtual traffic manager to receive the forwarded network traffic, wherein the one or more translation modules associated with each upgraded hypervisor are configured to support a negotiation process to identify a compatible version of the one or more upgraded hypervisors by mapping different versions of the one or more upgraded hypervisors that are compatible to the one or more other translation modules associated with the corresponding virtual traffic managers, and wherein different versions of candidate upgrade packages are stored in a non-transitory processor readable memory that is accessible over layers 1 and 2 by the one or more hypervisors the mapping of different versions of the candidate upgrade packages; and employing the same upgraded hypervisor to use the one or more translation modules to communicate with different versions of the one or more other translation modules of the one or more virtual traffic managers.

9. The network device of claim 8, wherein upgrading the one or more hypervisors further comprises automatically upgrading one or more translation modules for the upgraded hypervisor, wherein the one or more translation modules map messages and data structures between different versions of a hypervisor and the hypervisor's corresponding virtual traffic managers.

10. The network device of claim 8, wherein deactivating the one or more determined hypervisors further comprises:
bleeding off one or more connections to the one or more corresponding virtual traffic managers;
suspending operation of the one or more corresponding virtual traffic managers; and
suspending operation of the one or more determined hypervisors.

11. The network device of claim 8 further comprising:
receiving network traffic at the one or more hypervisors;
processing at least a portion of low level network traffic on the one or more hypervisors; and
forwarding at least a portion of high level network traffic to one or more virtual traffic managers that corresponds to the one or more hypervisors; and
processing the at least portion of the high level network traffic on the one or more virtual traffic managers that corresponds to the one or more hypervisors.

12. The network device of claim 8, wherein determining one or more hypervisors for upgrading further comprises:
generating an upgrade priority score for the one or more hypervisors; and
determining the one or more hypervisors for upgrading based on the upgrade priority score.

13. The network device of claim 8, wherein the one or more upgraded hypervisors communicate with one or more command hypervisors to obtain configuration information.

14. The network device of claim 8, further comprises performing the actions of claim 8 for each other hypervisor in the cluster of nodes.

15. A processor readable non-transitive storage media that includes instructions for upgrading one or more hypervisors in a cluster of nodes, wherein execution of the instructions by a processor device performs actions, comprising:
iteratively determining the one or more hypervisors for in service upgrading to prevent interruption of communication over the network by the cluster of nodes, wherein each of the one or more hypervisors determined for in service upgrading correspond to a virtual traffic manager that is part of a virtual cluster of virtual traffic managers that spans at least two nodes and the one or more determined hypervisors are instantiated on one or more separate blade server computers, and wherein one or more non-transitory processor readable memories are configured and arranged to store instructions sufficient to implement the one or more determined hypervisors that are associated with one or more translation modules and the corresponding virtual traffic managers that are associated with one or more other translation modules, performing further actions:
deactivating operation of the one or more determined hypervisors and the one or more corresponding virtual traffic managers while the virtual cluster remains operative;
upgrading the one or more deactivated hypervisors, wherein the upgrading includes one or more of enabling inactive software code, change a configuration of running software, re-purposing the one or more deactivated hypervisors to perform one or more different functionalities, rolling back a current version of software code to a prior version, or replacement of hardware; and
preventing interruption of communication over the network by the cluster of nodes by re-activating the one or more upgraded hypervisors and each corresponding virtual traffic manager for the virtual cluster; and
providing in service communication between the at least one re-activated hypervisor and each corresponding virtual traffic manager, wherein the upgraded hypervisor provides management control of Layer 1 and 2 network traffic of the Open Systems Interconnect (OSI) stack, and wherein each upgraded hypervisor employs their translation module to forward OSI Layer 3 through Layer 7 network traffic to one or more other translation modules that are employed by their associated virtual traffic manager to receive the forwarded network traffic, wherein the one or more translation modules associated with each upgraded hypervisor are configured to support a negotiation process to identify a compatible version of the one or more upgraded hypervisors by mapping different versions of the one or more upgraded hypervisors that are compatible to the one or more other translation modules associated with the corresponding virtual traffic managers, and wherein different versions of candidate upgrade packages are stored in a non-transitory processor readable memory that is accessible over layers 1 and 2 by the one or more hypervisors the mapping of different versions of the candidate upgrade packages; and
employing the same upgraded hypervisor to use the one or more translation modules to communicate with different versions of the one or more other translation modules of the one or more virtual traffic managers.

16. The media of claim 15, wherein upgrading the one or more hypervisors further comprises automatically upgrading one or more translations module for the upgraded hypervisor, wherein the one or more translation modules map messages and data structures between different versions of a hypervisor and the hypervisor's corresponding virtual traffic managers.

17. The media of claim 15, wherein deactivating the one or more determined hypervisors further comprises:
bleeding off one or more connections to the one or more corresponding virtual traffic managers;
suspending operation of the one or more corresponding virtual traffic managers; and
suspending operation of the one or more determined hypervisors.

18. The media of claim 15 further comprising:
receiving network traffic at the one or more hypervisors;
processing at least a portion of low level network traffic on the one or more hypervisors; and
forwarding at least a portion of high level network traffic to one or more virtual traffic managers that correspond to the one or more hypervisors; and
processing the at least portion of the high level network traffic on the one or more virtual traffic managers that corresponds to the one or more hypervisors.

19. The media of claim 15, wherein determining one or more hypervisors for upgrading further comprises:
generating an upgrade priority score for the one or more hypervisors; and
determining the one or more hypervisors for upgrading based on the upgrade priority score.

20. The media of claim 15, wherein the one or more upgraded hypervisors communicates with one or more command hypervisors to obtain configuration information.

21. The media of claim 15, further comprising performing the actions of claim 15 for each other hypervisor in the cluster of nodes.

* * * * *